(12) United States Patent
Odom et al.

(10) Patent No.: US 6,497,430 B1
(45) Date of Patent: Dec. 24, 2002

(54) MASS PROFILING SYSTEM

(75) Inventors: Douglas Odom, Sandy, UT (US); Cesar A. Montano, Pleasant Grove, UT (US); Thomas Danielson, Midvale, UT (US); David Beck, West Jorden, UT (US)

(73) Assignee: Sensitron Inc., Midvale, UT (US)

( * ) Notice: Subject to any disclaimer, the term of this patent is extended or adjusted under 35 U.S.C. 154(b) by 0 days.

(21) Appl. No.: 09/261,695

(22) Filed: Mar. 3, 1999

(51) Int. Cl.[7] .............................................. B60R 21/32
(52) U.S. Cl. ................... 280/735; 180/273; 73/862.381
(58) Field of Search ...................... 280/735; 180/273; 73/862.38, 172, 862.381, 862.338

(56) References Cited

U.S. PATENT DOCUMENTS

| | | | | |
|---|---|---|---|---|
| 3,749,866 A | * | 7/1973 | Tiazkun et al. ........... 200/85 A |
| 5,010,774 A | * | 4/1991 | Kikuo et al. ............. 73/862.04 |
| 5,079,949 A | * | 1/1992 | Tamori ......................... 73/172 |
| 5,086,652 A | * | 2/1992 | Kropp ........................... 73/767 |
| 5,086,785 A | * | 2/1992 | Gentile et al. ............... 128/782 |
| 5,157,372 A | * | 10/1992 | Langford .................... 338/211 |
| 5,232,243 A | * | 8/1993 | Blackburn et al. .......... 280/732 |
| 5,253,656 A | * | 10/1993 | Rincoe et al. ................ 73/172 |
| 5,309,135 A | * | 5/1994 | Langford .................... 338/211 |
| 5,563,354 A | * | 10/1996 | Kropp ........................ 280/731 |
| 5,583,476 A | * | 12/1996 | Langford .................... 338/211 |
| 5,612,876 A | * | 3/1997 | Zeidler et al. ................ 701/45 |
| 5,624,132 A | * | 4/1997 | Blackburn et al. ........... 280/735 |
| 5,732,375 A | * | 3/1998 | Cashler ....................... 280/735 |
| 5,821,633 A | * | 10/1998 | Burke et al. ................. 280/735 |
| 5,865,463 A | * | 2/1999 | Gagnon et al. .............. 280/735 |
| 5,878,620 A | * | 3/1999 | Gilbert et al. ................. 73/172 |
| 5,905,210 A | * | 5/1999 | O'Boyle et al. ........ 73/862.331 |
| 6,015,163 A | * | 1/2000 | Langford et al. ........... 280/735 |
| 6,149,190 A | * | 11/2000 | Galvin et al. ................ 280/735 |
| 6,161,891 A | * | 12/2000 | Blakesley ................ 296/65.01 |

* cited by examiner

Primary Examiner—Paul N. Dickson
Assistant Examiner—Deann L. Draper
(74) Attorney, Agent, or Firm—Holme Roberts & Owen LLP

(57) ABSTRACT

An air bag system has an array of detectors positioned under the seat material of a vehicle seat upon which a person or mass can be positioned. The array has a plurality of sensor leaves extending from a plurality of sensor branches. The branches extend from a trunk. Each sensor is of the type which predictably changes resistance upon the mechanical deflection thereof. A deflector is positioned to concentrate the deflection forces on the sensor leaf. Each sensor leaf has a substrate with conductive material on one side and a backer on the other. The sensor array output is supplied to a terminal and then to operation means which are connected to arm or disarm an air bag actuator to regulate the operation of the air bag in accordance with the mass such as an occupant or a child car seat on the vehicle seat. Each sensor leaf senses the force of the mass in a segment or quadrant and supplies the signals to a computer which processes and compares to known data to regulate the enabling or disabling of the air bag actuator.

30 Claims, 16 Drawing Sheets

Resistance (k ohms) vs. Deflection of Sensor

MASS PROFILING SYSTEM

BACKGROUND OF THE INVENTION

1. Field

This invention relates to air bag inflation systems including sensors and systems for profiling a mass positioned on a substrate and more specifically systems and structures for profiling the mass of that which is positioned on the seat of a vehicle such as an automobile.

2. State of the Art

Today many automobiles have an air bag system which activates to inflate an air bag and in turn position the air bag in front of the operator and in some cases to position another bag in front of the front seat passengers. Air bags have also been installed in side door panels of some vehicles. The purpose of the air bags is to act as a cushion and in turn reduce injury to the operator and passengers from interaction with front structures such as the steering wheel, dash board and windshield or with side structures such as the side door or side window of an automobile arising from a sudden impact and in turn sudden change of speed of the vehicle. For example, detectors are positioned to sense the sudden deceleration of the vehicle that may be imposed by an accident or crash. The detectors are connected to the air bag system to electrically activate gas generators positioned to inject gas into and inflate one or more large air bags. The air bags thereupon rapidly inflate or deploy to function, for example, one to cushion a driver and one to cushion the passenger, positioned on the front passenger seat of the automobile. That is, the air bags inhibit the forward movement of the driver and passenger due to inertia to eliminate the resulting injury should they move into contact with the vehicle. Air bags are also configured to deflate fairly quickly so that they will not interfere with, for example, breathing of the person or vehicle egress.

It seems to be accepted that air bag arrangements are responsible for protecting and saving many people who have been in serious accidents. However, air bags have been known to inflate when the vehicle and its occupants are not in any serious jeopardy. For example, vehicles encountering a large bump or hole in the road surface reportedly have had their air bag systems activate and inflate the air bags. Minor vehicle interactions (e.g., slow speed accidents) are also believed to have led to activation when the vehicle occupants are not in serious jeopardy. Activation in such cases can impose a rearward force on an occupant that is not desired. Also activation may interfere with the driver's vision and in turn interfere with the operation of the vehicle.

The air bag for the driver is typically positioned in the hub of the steering wheel. In some vehicles, the horn has been moved from a typical or traditional central position to buttons on, for example, spokes of the steering wheel to provide the space for the air bag. Systems for operating the horn of the vehicle in a central position of the steering wheel have been devised even though the bag is in the hub. U.S. Pat. No. 5,576,684 (Langford), the disclosure of which is hereby incorporated by this reference, discloses a system suitable for use in the hub of the steering wheel with provisions for horn operation. Activation of the driver air bag inhibits driver interaction with the steering wheel, steering wheel column and even the windshield.

An inflating air bag proceeds outwardly from the vehicle structure and toward the occupant very rapidly so that it fills in the space in front of the occupant before the inertia forces on the occupant can cause the occupant to project into the vehicle structure. Thus an inflating air bag proceeds outwardly not only rapidly but also with some force inasmuch as it must absorb the force imposed on it by the forward moving occupant.

Inasmuch as the operator of a vehicle is typically over the age of 16, the range of design parameters for the driver air bag is within certain practical limits. Thus, should an air bag inflate, the speed and force exerted can be selected to be consistent with the physical characteristics (e.g., size, height, weight) of the operator. However, for the passenger seat in the front seat area of the vehicle, the occupant can range in size and configuration from a baby in a car seat to a small child to a full sized adult. Further, the front seat may have a wide variety of objects positioned on it ranging, by way of example, from a woman's purse to a sack of groceries. Typical air bag systems do not sense the identity of the occupant or object in the seat. The air bag deploys even if there is no one or nothing in the passenger seat. Further, presently known air bag systems do not take into account the size or character of that which is in the passenger seat and are thereby unable to adjust to accommodate to the size and character of that which is in the front seat.

Because an air bag inflates with great speed and with a force sufficient to sustain the force of a large adult projecting forward at great speed, some adults are reportedly bruised or otherwise injured by the inflating air bag. Some small passengers are not able to sustain the force of the air bag and reportedly may sustain some significant injury thereby. There have been reports in the press of injuries and even fatalities of small children attributed to air bag inflation. See, P. Carbonara, IS THAT A BOMB IN YOUR DASHBOARD (MONEY magazine, NOVEMBER 1998, pp. 131–138).

To reduce injuries to small occupants, some effort is being made to install a switch to regulate the passenger side air bag. That is, an on-off switch is being incorporated into the air bag system so that an operator may deactivate the air bag depending on the nature/character of the passenger (e.g., a baby in a car seat carrier). Of course use of the on-off switch is believed to also propose risks if the operator places the switch in an "off" condition and fails to return it to "on" for an appropriately sized passenger. It is also understood that some have proposed systems to vary the pressure of the air bag relative to the size of the occupant. However, no effective system for doing so is known at this time.

Systems to detect the presence of a seat occupant or object in the seat and also to determine certain characteristics sufficient to properly determine when air bag inflation is desired and when it is not desired and to provide a signal that may be used for a system to vary the pressure in the air bag have been proposed. However, such a system to be useful must be operative over a wide range of temperatures and be operative when immersed or wet. In such conditions, as well as, in normal dry conditions and temperature (e.g., 60° F.), such systems must be able to supply signals that are suitable for determining or profiling a mass that ranges from very small to very large. Further such a system must be rugged and reliable. Such a system is not presently available or known.

BRIEF SUMMARY OF THE INVENTION

An air bag system includes a detector arrangement with related circuits and components. The detector senses the presence of and supplies signals from which one may classify a mass (e.g., an object or person) positioned on a substrate such as the seat of a vehicle (e.g., automobile, truck, airplane). A sensor arrangement is positioned in the seat and configured to sense the mass and general configuration of that which is in the seat by sensing downward forces exerted in selected sectors of the seat. The sensor generates signals that are reflective of the mass on the seat. The signals are of the type which may thereafter be processed and compared with known information for a given mass to produce an output signal which arms or disarms the gas generator of an air bag to regulate the gas generator as desired.

In one form, the invention is a detector for positioning between a base and a surface. The detector is operable for detecting a force or pressure at one or more locations of a plurality of locations on a deformable surface and for generating a signal reflective of the presence of the force or pressure applied at the plurality of locations. In another form, the detector generates signals reflective of the profile and relative magnitude of the deflection and in turn the force or pressure.

A sensor mat is positioned between the base and the surface. The sensor mat is configured to mechanically deflect upon mechanical deflection of the surface toward the base upon application of the force or pressure to the surface at any one or more of the plurality of locations. The sensor mat has at least a plurality of sensors positioned for mechanical displacement upon the displacement of the surface. The sensor of said plurality of sensors is of the type which predictably changes a measurable electrical characteristic upon the application of a force thereto. Conductor means is connected to each sensor to supply electrical power thereto and is connected to at least one sensor of the plurality of sensors to transmit therefrom signals reflective of changes in the measurable electrical characteristic of the one sensor. A terminal means is conductively connected to the conductor means for electrical connection to a source of electrical power for receiving and supplying electrical power to said sensor mat and for electrical connection to an external circuit configured to receive signals reflective of said changes in the measurable electrical characteristic of at least the one sensor.

Preferably, the surface is divided into a plurality of sectors with each sector having one location of the plurality of locations. More preferably, a sensor of the plurality of sensors of the sensor mat is positioned proximate a location in a sector of the surface to mechanically deflect upon deflection of the sector at the location in that sector for supplying the signals reflecting a change in the electrical characteristic. Even more preferably, the plurality of sensors includes a separate selected plurality of sensors each of which has a predictable change in electrical resistance upon mechanical deflection thereof. One sensor or a plurality of the sensors may be force sensitive resistors.

In a preferred configuration, the conductor means includes a trunk member with a plurality of branch members extending therefrom. Each branch member has at least one sensor of the plurality of sensors, which is conductively connected thereto. More desirably, at least one branch member of the plurality of branch members has two sensors of the plurality of sensors connected thereto. In one configuration the mat includes six branch members. Preferably each of the six branch members includes two central members each having five sensors. Two outer members of the six branches each have three sensors. Inboard branch members include a left inboard member and a right inboard member each having six sensors of the plurality of sensors. Even more preferably, the sensor array is generally polygonal in projection. Each sensor is connected by conductors to a terminal circuit through a preferred connector.

In a desirable alternate, a deflector structure is positioned relative to a sensor for contacting the sensor upon application of the force in a sector of the surface.

At least one sensor of the selected plurality of sensors preferably has a substrate configured to deflect about a transverse axis and an electrically conductive composition deposited on a substrate to be deflected with the substrate about the transverse axis. The deflector structure is preferably constructed with a longitudinal axis which may be generally positioned to be in alignment with the transverse axis. Desirably the deflector structure is shaped to act as a fulcrum about which the substrate deflects upon application of said force at the location in a sector. The deflector structure is desirably sized to extend substantially the width of the substrate. In a highly preferred configuration the deflector structure is cylindrical in shape.

In one application or embodiment, the surface includes the outer material layer of a seat structure suitable for use in a vehicle. The base includes the structure of the seat structure covered with the outer material layer.

In one preferred embodiment, an air bag system is provided in which an air bag is configured to be inflated with a gas. The air bag includes a bag mechanism with a bag operable from a stored position to an expanded position by inflation with said gas. The air bag also includes gas supply means positioned for supplying gas to the air bag to urge the bag to its expanded position upon receipt of an activation signal.

The air bag system includes a sensor system for generating the activation signal. The sensor system includes a base positioned proximate the substrate with a sensor mat positioned between the base and the substrate so that upon mechanical deflection of the substrate toward the base at one or more of a plurality of locations, one or more of a plurality of sensors will deflect. Each sensor is positioned for mechanical deflection upon the deflection of the substrate at the plurality of locations. Each sensor of the plurality of sensors is of the type that predictably changes a measurable electrical characteristic upon mechanical deflection thereof.

The sensor system of the air bag also includes conductor means connected to each sensor to supply electrical power thereto and to transmit therefrom trigger signals reflective of changes in the measurable electrical characteristic of each sensor upon the application of a force or pressure to the surface. The sensor system also includes terminal means electrically associated with said conductor means for electrical connection to a source of electrical power for receiving and supplying electrical power to the sensors and to the conductor means for receiving and transmitting the trigger signals.

The sensor system of the desired air bag includes operation means conductively connected to a source of electrical power to receive electrical power therefrom and to the terminal means to receive trigger signals reflective of the changes in the measurable electrical characteristic of each sensor. The operation means is configured to compare the trigger signals with preselected operational values and calculate the difference or an error signals reflective of the magnitude of the differences there between, and to generate activation signals based on the presence of the difference or error signals of preselected magnitude. The operation means is conductively connected to the air bag means to supply said activation signals to said gas supply means.

Desirably the air bag is installed in and a part of a vehicle such as an automobile, bus, train, plane, or the like.

To profile the mass or at least one characteristic of that which is on the seat, a sensor array of the type hereinbefore is installed in the vehicle. The system includes a computer connected to the terminal structure programmed to process the signals and to enable the gas generator upon determination of a preselected mass and/or profile.

BRIEF DESCRIPTION OF THE SEVERAL VIEWS OF THE DRAWING

In the drawings which set forth what is presently regarded as preferred embodiments of the invention.

DETAILED DESCRIPTION OF THE INVENTION

Figure 1:
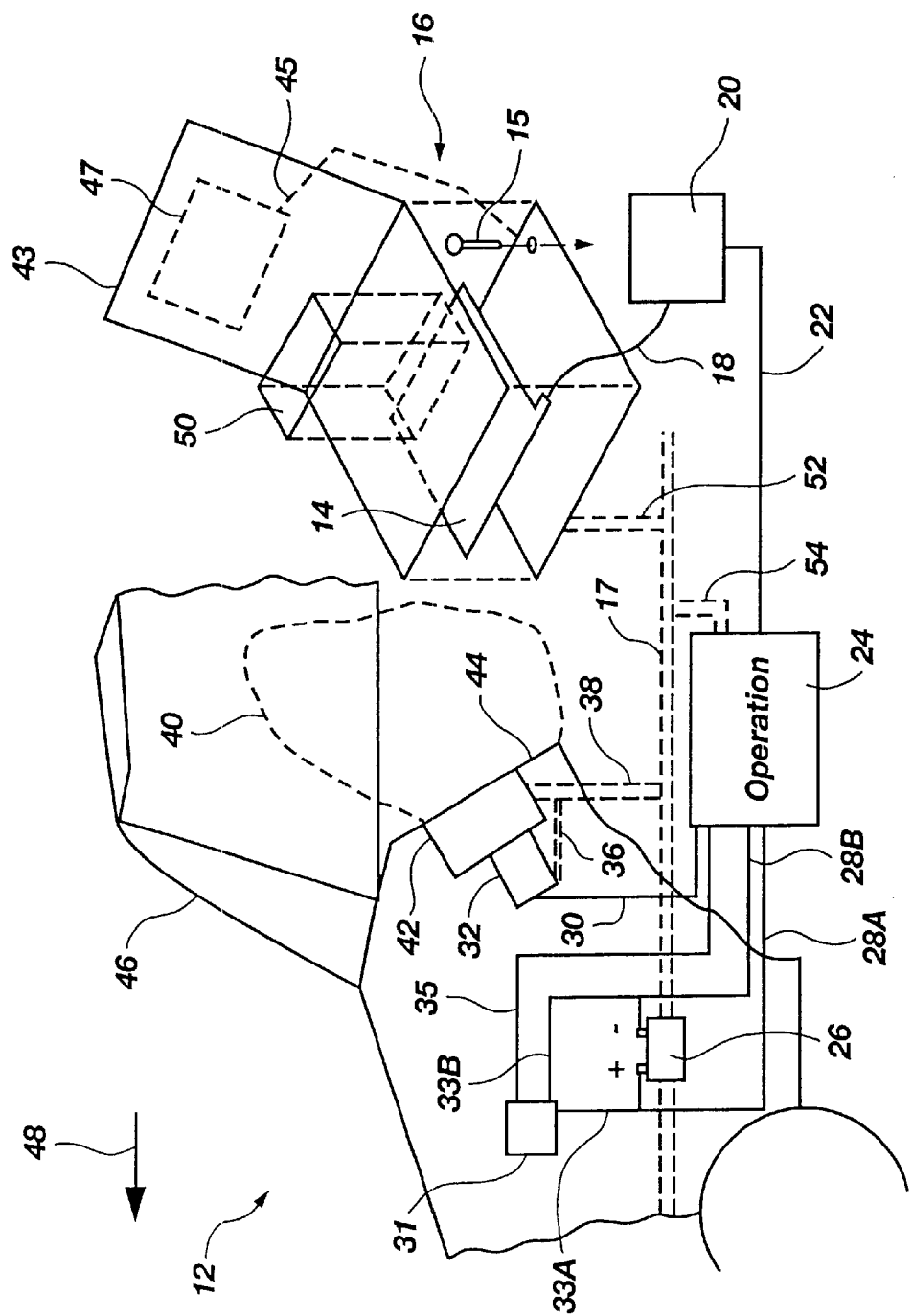
FIG. 1 is a depiction of a vehicle in part with a seat and related blocks of a sensor and air bag systems of the present invention.

The air bag system 10 of FIG. 1 is shown mounted in a vehicle 12. The vehicle 12 is depicted in FIG. 1 as a motor vehicle such as an automobile depicted in cross section to show the passenger side. Even though the vehicle 12 depicted is a passenger automobile, it should be understood that the vehicle may be any assembly suitable for transporting or moving a person or cargo. The involved vehicles include virtually all types and kinds of automobiles, trucks, pick-up trucks, sport utility vehicles, vans, busses, trolleys, trains, airplanes, helicopters, gliders, space craft, various military vehicles, and the like. The vehicles may include golf carts and carnival or theme park rides like roller coaster cars or other so-called rides in which occupants are put into motion. Indeed, even trailers such as those that carry valuable cargo or animals such as horses may be equipped with air bags to protect the contents or the animal.

Sudden deceleration means that a vehicle may be suddenly decelerated from a high speed to a low speed or zero speed in a very short time. The change in speed is somewhat dependent on the vehicle. For most ground vehicles such as automobiles, trucks and the like, the deceleration is from any suitable speed in which the momentum imparted to the driver and passengers is such that a sudden stop or deceleration may lead to risk of injury. For example, they could be moving at 60 miles per hour and decelerate to zero miles per hour in a very short time such as, for example, less than 0.5 second. Clearly, deceleration of a jet fighter airplane in normal landing is not intended to be a trigger to activate the system, but the deceleration in the event of a crash of that jet fighter is contemplated as an event that would trigger the air bag system.

The driver, passenger(s) and/or cargo, including goods, animals or the like, all have and may be said to be a mass. The mass positioned in such a vehicle will have an inertia imparted to it by the vehicle. Some event which will cause the vehicle to lose its inertia and more specifically rapidly change speed may result in relative movement between the vehicle and the mass unless the mass is restrained. Typically, a vehicle is assumed to be moving at some sustained speed with the mass there within. In that situation, should the vehicle change speed and, for example, come to a sudden stop because of an impact with some other object, the mass with its inertia will tend to continue at some speed. Unless restrained, the mass will contact the interior of the vehicle and potentially harm or damage the mass and/or the vehicle. Seat belts of various designs are found in many vehicles to secure the mass to the vehicle and to preclude relative movement between them. However, the seatbelts may not be installed correctly, may fail or otherwise may not preclude relative movement between the mass and the vehicle.

In one typical situation, it is recognized that a driver positioned in a vehicle such as an automobile and wearing a proper restraint such as a seat belt including a shoulder belt may nonetheless overcome those restraints and move relative to the vehicle. Of course in the event of a failure to use the restraint system, relative movement is virtually inevitable unless the person has the strength to limit his/her own movement.

Obviously, passengers and, of course, cargo are all recognized as susceptible to relative movement in a vehicle that suddenly changes speed. Use of an air bag system is known for passengers in the front seat of many automobiles. Use of air bags in other seats have been discussed. For example, an air bag may be positioned in the back of the front seats or in the doors so that the air bag may deploy to protect passengers in the rear seats. Similarly, air bags are now being commercially made available to deploy from the side such as from the interior of a door of an automobile to protect occupants in the event of a collision from the side of the vehicle.

The air bag system 10 is depicted mounted in a motor vehicle 12 for purposes of illustration. The air bag system 10 is suitable for other vehicles as discussed herein above. The air bag system 10 has a detector 14 associated with a seat 16 that is mounted to the frame 17 of the vehicle 12 in any convenient manner such as by bolts 15 with suitable nuts, or by any other suitable means to effect a secured connection such as by rivets, welding or the like. The detector 14 is conductively connected by first conductor means 18 to a terminal 20 to supply power to the detector 14 and to transmit trigger signals to the terminal 20. The terminal 20 is conductively connected by second conductor means 22 to operation means 24 to receive power therefrom and to supply the trigger signals thereto. The operation means 24 is connected to receive power from a source such as battery 26 by a positive conductor 28A and a negative conductor 28B.

The operation means 24 is also connected by conductor means 30 to an air bag activator 32 attached to the vehicle frame 34 by any appropriate intervening mounting members 36 and 38 or any other suitable interconnecting structure.

A detector 31 is also attached to the vehicle 12 and connected by conductors 33A and 33 B to send an activate signal to the operation means 24 via conductor 35. The operation means 24 thereupon sends an activate signal to the air bag activator 32, and the air bag 40 thereupon deploys or inflates.

The air bag activator 32 is positioned to inflate or deploy an air bag 40 shown in dotted line to illustrate its inflated or deployed configuration. Before deployment or inflation, the air bag 40 is positioned within a housing 42 which is also mounted to the vehicle frame 17 (shown in dotted line) by member 38 (shown in dotted line) or any other suitable interconnecting structure. Of course the seat 16 and the operation means 24 are also mounted to the vehicle frame 17 by suitable interconnecting members 52 and 54 (shown in dotted line). The interconnecting members 52 and 53 as well as members 36 and 38 are representative of any mounting arrangement which directly or indirectly is supported by or connected to the vehicle frame 17.

When the air bag 40 is deployed or inflated as shown in FIG. 1, a mass 50 positioned on the seat 16 may be inhibited from moving forward and contacting the dash board 44, windshield 46, or other vehicle structure in the event of a sudden or rapid deceleration. In other words, the vehicle 12 is presumed to move forward 48 at a rate of speed sufficient to impart momentum to the occupants so that operation of the air bag system is warranted to protect the occupants. In the event of a sudden deceleration or stop, the vehicle 12 will lose its inertia by transferring its energy while any mass 50 (e.g., person, cargo, animal) on the seat 16 will have an inertia that will cause the mass 50 (shown in dotted line) to continue to move in the forward direction 48. The deployment of the air bag 40 inhibits forward 48 movement of the mass 50.

Figure 2:
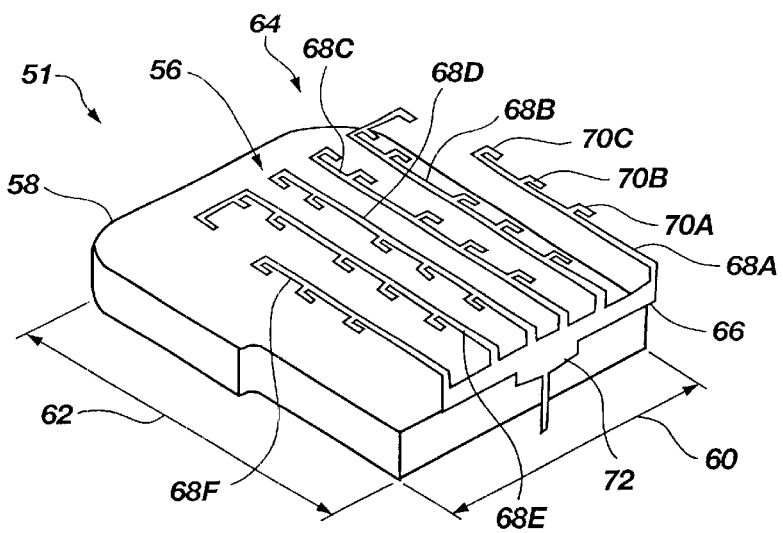
FIGS. 2–4 are perspective depictions of sensor mats of the invention for use with seats for particular vehicles.

The detector 14 of FIG. 1 is an array of sensors positioned to sense the mass 50 positioned on the seat 16. FIG. 2 shows an array 56 suitable for use with a chair or seat 57 found in a Chevrolet BLAZER™ sport utility vehicle in model years such as 1997 and 1998. The chair or seat 57 has a seat portion 58 and a back or back rest portion not here shown. The seat portion has a width 60 and a depth 62. The array 56 is suitably sized to fit within the surface area 64 of the seat portion 58. The array 56 has a trunk 66 with a plurality of six branches 68 A, 68 B, 68 C, 68 D, 68 E and 68 F. Each branch 68 A, 68 B, 68 C, 68 D, 68 E and 68 F has a plurality of sensors each electrically connected to the terminal 20 as hereinafter discussed. For example, the branch 68A has sensors 70 A, 70 B and 70 C attached thereto.

Figure 3:
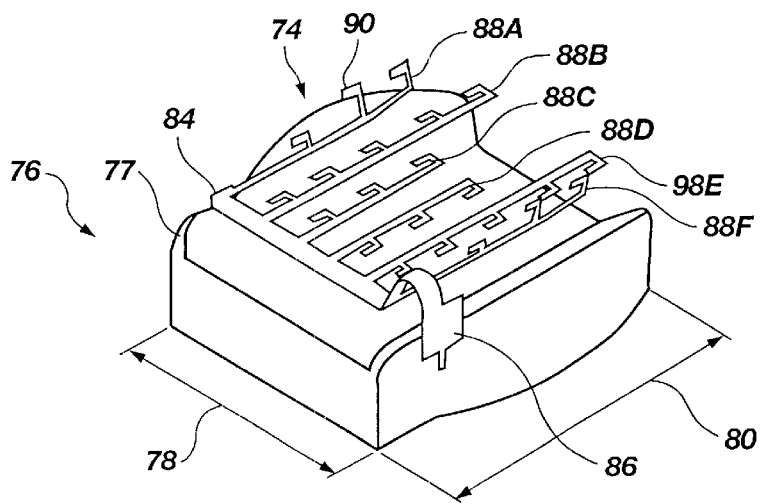

FIG. 3 shows another array 74 configured for use with the seat 76 of a BMW Z3™ model vehicle. The seat 76 has a seat portion 77 and a back portion not here shown. The seat portion has a width 78 and a depth 80 as well as a shape to which the array 74 is sized to fit. The array 74 also has a trunk 84 connected to a terminal 20 via connector 86. A plurality of branches 88 A, 88 B, 88 C, 88 D, 88 E and 88 F are connected to terminal 20 via the trunk 84 to receive power and to send sensor signals to the terminal 20 from the plurality of sensors such as sensor 90 on branch 88 A.

Figure 4:
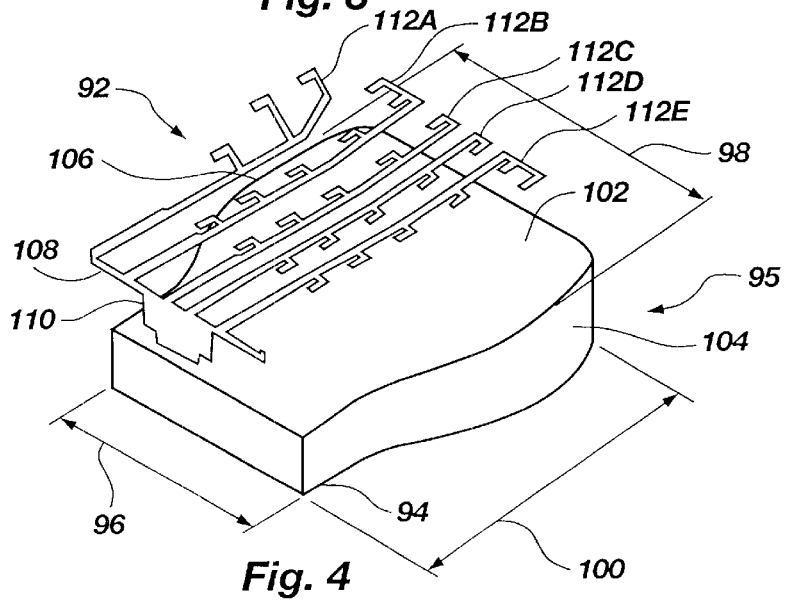

In FIG. 4, the array 92 is configured for positioning on the seat portion 94 of the seat 95 of a FORD TAURUS™ model automobile. The seat 95 has a seat portion 94 shown and a back or back rest portion not here shown for clarity. The seat portion 94 can be seen to have a short base width 96, an extended width 98 and a depth 100 all to define a surface 102 having a "footprint" or projection area in a particular shape. That is, the seat portion 94 can be said to have wings 104 and 106 to which part of the array 92 is configured. Here, the array 92 is also shown with a trunk 108 connected to a terminal 110 with a plurality of branches 112 A, 112 B, 112 C, 112 D and 112 E all connected to the trunk 108. Each of the branches 112 has a plurality of sensors attached thereto to send sensor signals to the terminal for further transmission to external circuits.

From FIGS. 2, 3 and 4, it can be seen that an array, such as array 92, can be devised to accommodate the differing widths, depths, and shapes of a seat. That is, by forming the array with a trunk and with a plurality of branches, the material used in construction or manufacture of the array is reduced. At the same time the array is flexible, reliable and shaped to fit the seat and sense the presence of a mass on the seat portion. Given that each sensor is connected directly to the terminal 20, one or more sensors and even one or more branches can become inoperative without necessarily affecting the operability of the other branches and the operability of the air bag system.

Figure 5:
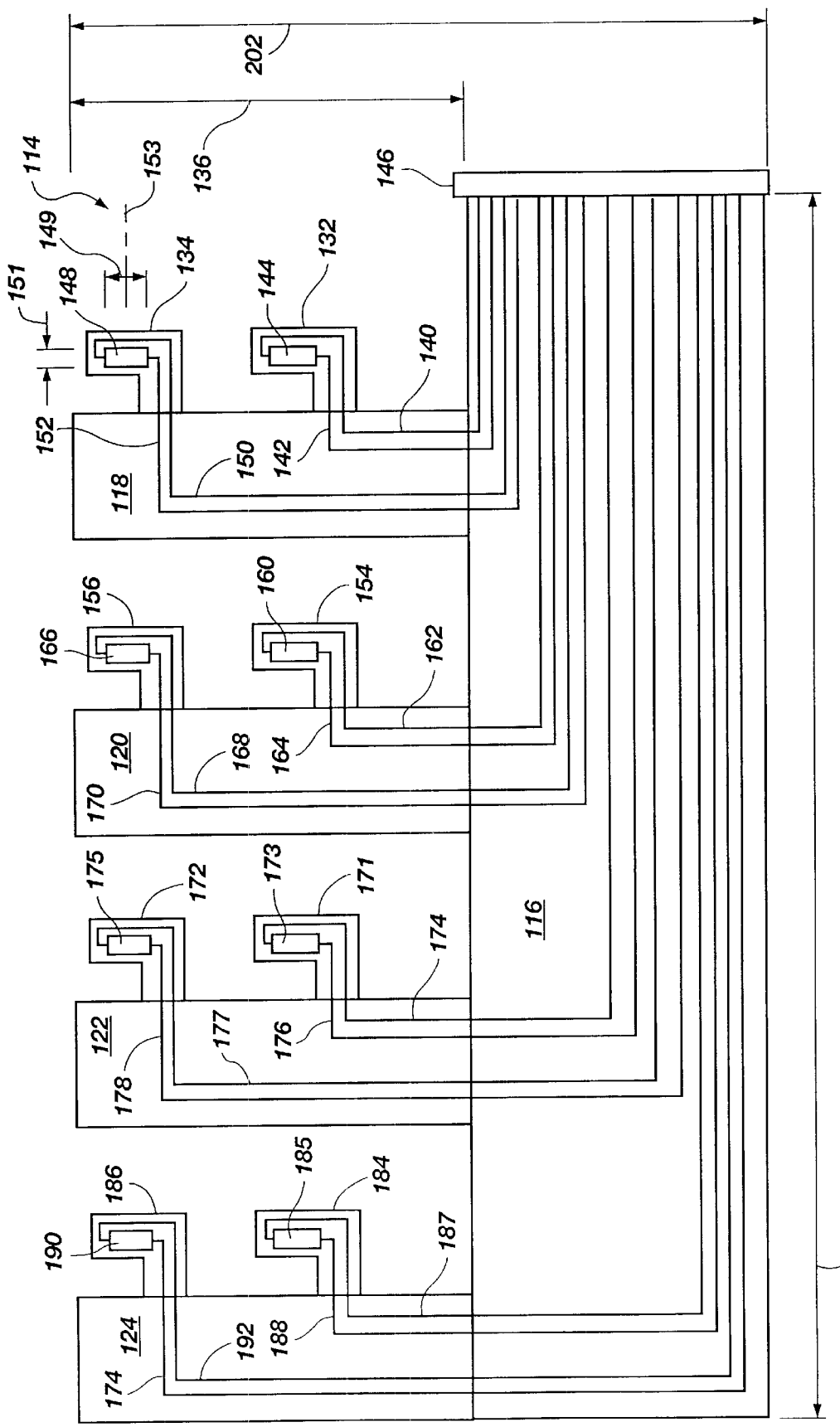
FIG. 5 is a schematic of a trunk with branches with sensors of the present invention.

FIG. 5 shows an array 114 having a trunk 116 with branches 118, 120, 122 and 124 connected thereto. The branches 118, 120, 122 and 124 are each secured to the trunk 116 in an appropriate manner or formed unitarily therewith. That is the branches 118, 120, 122 and 124 may be stapled, glued, welded or otherwise affixed to preclude relative movement and effect a physical connection. Preferably the branches 118, 120, 122 and 124 are unitarily formed with the trunk 116. Formation may be affected by stamping with a die fabricated to form the physical shape of the array 114 from a sheet of base material as hereinafter discussed.

Branch 118 is shown with a first sensor leaf 132 and a second sensor leaf 134 spaced from each other and positioned along and secured to the branch 118 along the length 136 of the branch 118. The leaves 132 and 134 each formed from the base material and are secured to the branch 118 by staples, glue, welding or the like to preclude relative movement and effect a physical connection. Preferably the leaves 132 and 134 on branch 118 and on the other branches as hereinafter discussed are unitarily formed from the base material with the branches 118, 120, 122 and 124 and the trunk 116 by use of the die.

The first leaf 132 has a sensor 144 positioned or formed thereon with first sensor conductors 140 and 142 extending from the leaf onto the branch 118 and then along the trunk 116 for connection to the terminal 20 by any suitable pin connector 146. However, any structure for effecting a connection may be used as desired.

The branch 118 also has a sensor 148 positioned or formed on the second leaf 134. Second sensor conductors 150 and 152 are connected thereto and extend along the branch 118 and trunk 116 for connection via connector 146 to the terminal 20. The sensor 148 has a legth 149 and width 151 and deflects about a transverse axis 153 as hereinafter discussed. The other sensor of the array 114 are similarly configured.

Branch 120 is shown with a third sensor leaf 154 and a fourth sensor leaf 156. Sensor 160 is formed on the leaf 154 and connected to third sensor leaf conductors 162 and 164 that extend along the branch 120 and the trunk 116 for connection to the terminal 20 by connector 146. Sensor 166 is connected to conductors 168 and 170 that similarly extend along the branch 120 and trunk 116 to the connector 146.

The branch 122 is shown with a fifth sensor leaf 171 and a sixth sensor leaf 172. The fifth sensor leaf 171 has a fifth sensor 173 connected by a fifth sensor leaf conductors 174 and 176. The sixth sensor leaf 172 has a sixth sensor 175 connected to the sixth sensor leaf conductors 177 and 178 that extend along the branch 122 and trunk 116 to the connector 146 for connection to the terminal 20.

The fourth branch 124 is here shown with the seventh sensor leaf 184 and the eighth sensor leaf 186. The seventh sensor leaf 184 has a seventh sensor 185 connected by seventh leaf conductors 187 and 188. The eighth sensor leaf 186 has an eighth sensor 190 connected by the ninth sensor conductors 192 and 194 which extend along the branch 124 and the trunk 116 to the connector 116 for further connection to the terminal 20.

Only four branches 118, 120, 122 and 124 are shown in FIG. 5. It should be understood that the number of branches provided is related to the substrate upon which the array such as array 114 is to be placed and more specifically its projection or footprint and the degree of precision desired to profile a mass positioned thereon such as mass 50 (FIG. 1). With the associated substrate upon which the array is to be placed being part of a seat of a vehicle, it has been found that four to eight branches are preferable although more or less may be used if desired. An array using six branches has been found to be preferable for most automobile seats.

In FIG. 5 each branch 118, 120, 122 and 124 is shown with only two sensor leaves attached thereto. It should be understood that the number of sensor leaves with sensors for each branch and for each array again will vary for the intended use. When used with a substrate that is part of a seat of a vehicle, it has been found that the number of sensors for a branch may vary from one to about eight. For most automobile seats, it has been determined that each branch will have from about two to about five sensor leaves. The number of sensor leaves will be determined largely by the degree of desired accuracy in the profiling of a mass positioned thereon such as mass 50 (FIG. 1). It should also be understood that any one, or more or all of the sensor leaves may have one or more sensors on them if desired. Each sensor preferably will be connected to the terminal by a pair of conductors.

The array 114 of FIG. 5 has a width 200 and a height 202 which is selected so that the array 114 fits within the substrate with which it is to be associated in use. Even though the array 114 shown may be said to be rectangular in projection, it should be understood that the array may be formed by sizing the length 136 of each of the branches 118, 120, 122 and 124 to fit with virtually any desired geometric shape including polygonal, circular, elliptical, triangular, and the like. It may also be formed to fit with solid-like surfaces including, for example, spherical surfaces. Indeed any array may be formed to fit with any object, surface or the like as long as a mass may be positioned on it or the object positioned on something else in a way that one desires to profile the forces there between.

The trunk 116 and the branches 118, 120, 122 and 124 as well as the first through eighth sensor leaves 132, 134, 154, 156, 171, 172, 184 and 186 are each formed of a base material which is an insulating material that is flexible over a wide range of temperatures (e.g., from about −30° F. to about 150° F.) while at the same time being thin and light weight. Any polyimide material in general will be suitable. Various forms of polyethelene, polyester, polyethylene terapthalate and polyethylene napthalate (PEN) may also be suitable. However, KAPTON™ material has been found particularly suitable. KAPTON is commercially available from E. I. Dupont de Nemours & Company of Wilmington Del.

The various conductors such as the sensor conductors 140, 142, 150, 152, 162, 164, 168, 170, 174, 176, 177, 178, 187, 188, 192 and 194 are all deposited on the base material to adhere thereto. Specifically, the conductors may be adhered by using a form of silk screening or a type of printing process. A suitable insulating material is preferably placed over the conductors to create a detector that is immersible in liquids. Various materials used for "potting" electronic components may be used. With an insulating material placed over the conductors, the array 114 can be said to be water resistant because it has the conductors sealed within and between the base material and the cover material.

Figure 6:
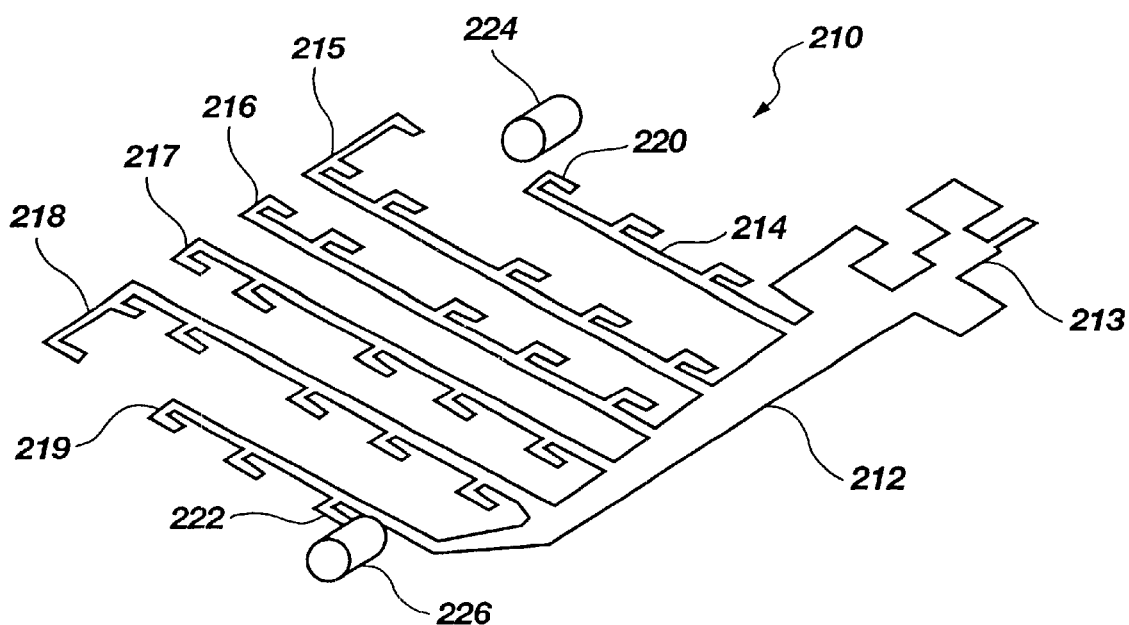
FIG. 6 is a perspective depiction of a sensor mat with deflector devices positioned relative thereto of the present invention.

Turning now to FIG. 6, a typical array 210 is illustrated for use with an automobile seat. The array 210 is shown with a trunk 212 and six branches 214–219 each having sensor leaves attached thereto such as sensor leaf 220 and sensor leaf 222. The branches all have conductors that are separately supplied to the terminal.

In FIG. 6, a first deflector mechanism 224 is shown positioned above the sensor leaf 220. The sensor leaf 220 has a sensor (such as a sensor 148 discussed hereinbefore) which is positioned thereon and which produces a change in an electrical characteristic or parameter (e.g., resistance) upon deflection of a portion of the sensor. Although sufficient deflection may be effected upon the sensors in one or more sensor leaves upon positioning a mass such as mass 50 on the related substrate, the deflector mechanism 224 is positioned proximate and preferably on top of the sensor to ensure that the deflecting forces are concentrated to cause the sensor to deflect. The deflector mechanism 226 is positioned below the sensor 222 to cause force concentration and deflection. A deflector mechanism such as deflector mechanism 224 and 226 may be and preferably is used with each sensor of each sensor leaf of an array such as the array 210. Each sensor (not shown) on each sensor leaf is connected to conductors that extend along the branches to the trunk 212 for connection to connector 213 for further connection to a terminal such as terminal 20.

Figure 7:
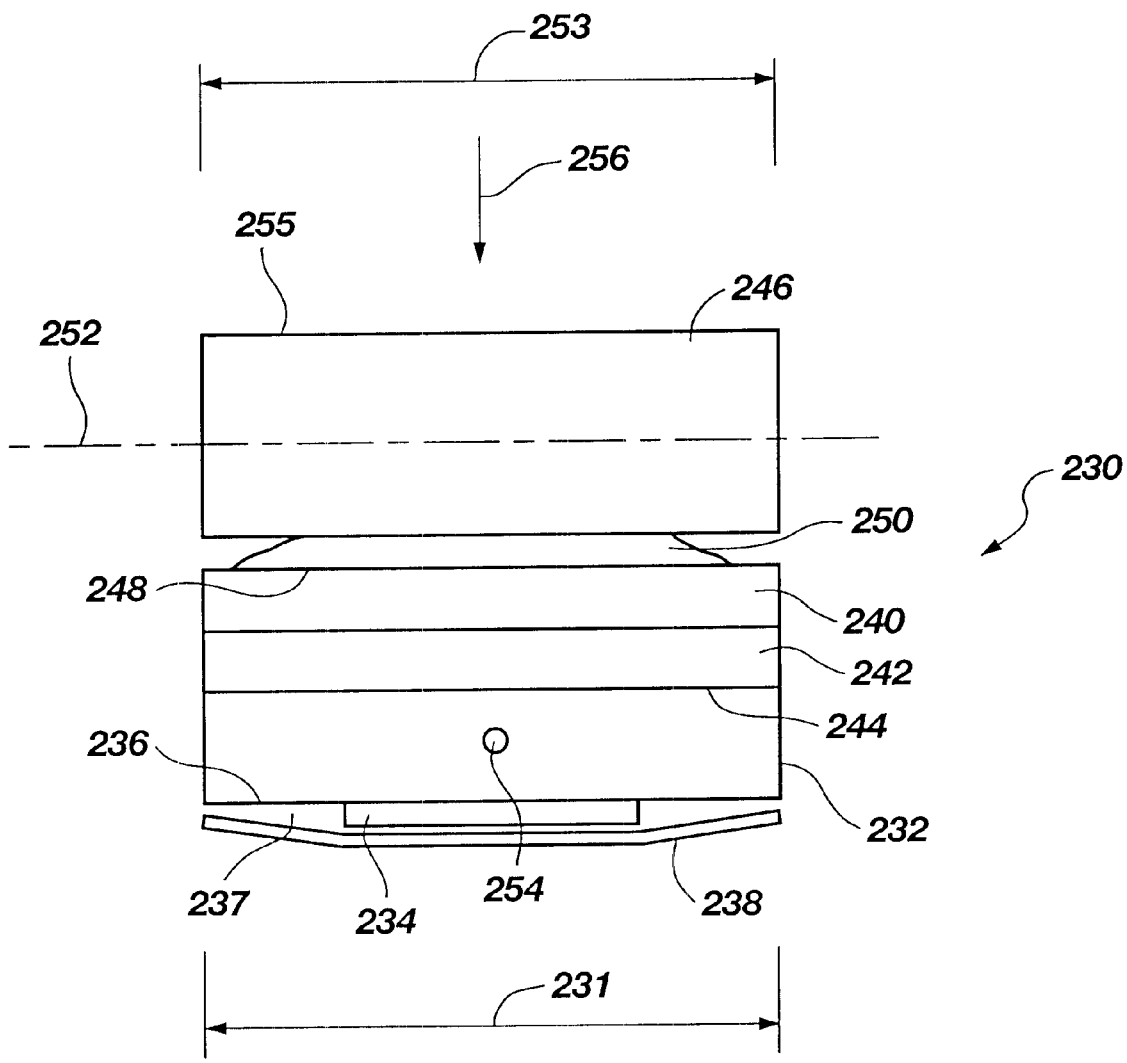
FIG. 7 is a cross section of a typical sensor leaf used with the present invention.

FIG. 7 is a cross section of a sensor leaf 230 of the type suitable for use with an array such as arrays 56, 74 and 92 as well as array 210. The sensor leaf 230 has a base 232 made of KAPTON™ or any other material that is insulating and also flexible over a wide range of temperatures (e.g., −30° F. and 150° F.) without distortion or inelastic deformation. A conductive ink 234 is deposited on one surface 236 of the base 232 along a portion of the width 231 and longitudinally along axis 254 to form what may be said to be a BEND SENSOR® resistive component as more fully described in U.S. Pat. No. 5,157,372 (Langford) and U.S. Pat. No. 5,583,476 (Langford) the disclosures of which are incorporated herein by this reference. The resistive component is connected by conductors to the terminal circuit such as circuit 20 to receive power and to supply signals thereto.

The conductive ink 234 deposited on the base 232 is an ink that has conductive material such as graphite with binders mixed together. The conductive ink 234 is deposited on a substrate such as the base 232 by means comparable to silk screening or printing. Appropriate conductive inks suitable for the present embodiments include graphite with binders. Suitable inks are available at Flexpoint, Inc. of Salt Lake City, Utah.

The conductive ink 234 is one that produces a predictable change in resistance upon deflection of a portion of the sensor as discussed hereinafter. The ink 234 and any conductors to which it is connected are covered with an insulating material 238 which is attached to the surface 236 by an adhesive 237 to effect a seal. A PEN material has been found to be suitable as an insulating material 238. A polyester material may also be suitable. As so configured, the ink 234 with its base 232 are operative to produce signals that predictably change upon deflection. In a preferred assembly, the base 232 is provided with a backer 240 that is secured by an adhesive 242 to the other surface 244 of the base 232. The backer 240 is a stiffener that has elasticity with no histeresis. That is, it will reliably return to its at-rest position from a deflected position.

A deflector mechanism 246 is shown attached to the upper surface 248 by an adhesive 250. The deflector mechanism 246 is cylindrical in shape with a longitudinal axis 252 oriented to be transverse to the axis 254 of the sensor 230 and more specifically the ink 234. The deflector mechanism 246 has a width 253 that extends substantially the width 231 of the base 232 as shown in FIG. 7. Force applied to the deflector mechanism 246 at any location 255 above the axis 252 will translate into a force or a force component directed downward 256 to effect a bending of the base 232 and in turn the conductive ink 234. Although the axis 252 of the deflector mechanism 246 is shown to be normal or transverse to the longitudinal axis 254 of the sensor leaf and the sensor 230 it should be understood that the deflector mechanism 246 may be oriented with its axis 252 not perpendicular to the axis 254. That is, the axis 252 may be oriented to be but a few degrees from alignment with the axis 254. Any orientation desired is acceptable as long as deflection is imposed on the base 232 and in turn the ink 234.

Although the deflector mechanism 246 is here shown to be cylindrical in shape, it may be of any desired solid geometrical shape which will cause the ink 234 to deflect in a specific mechanical manner to produce a deflection signal desired. Thus, it may also be spherical, elliptical or even triangular in cross section. Any shape is acceptable so long as it facilitates deflection of a portion of the sensor.

Although the above-described flexible sensor or BEND SENSOR® resistive component is regarded as the most suitable component for use in and with the systems herein disclosed, it is noted that a force sensitive resistor or even a piezoelectric component could be used to supply signals to a terminal and then to the operation means. Other electrical components may be suitable if they can be configured to produce signals that reflect displacement of sectors of the seat and when positioned in an array can reflect the profile of a mass in the seat.

Figure 8:
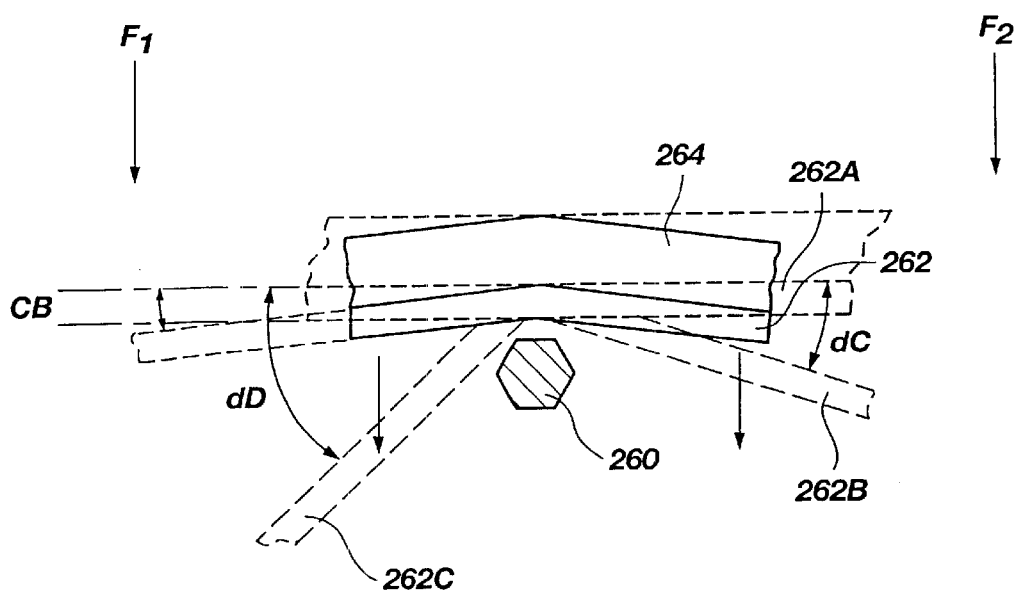
FIG. 8 is a schematic side view of a sensor and an alternate deflector device of the present invention.
Figure 9:
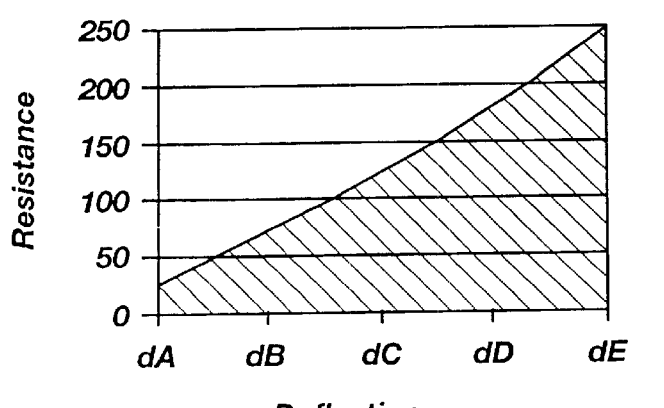
FIG. 9 is a graphical representation of resistance versus deflection of a sensor of the type for use with the present invention.

In FIG. 8, a deflector mechanism 260 is shown positioned below a sensor 262 with a substrate 264 (e.g., the seat material of an automobile seat) positioned there above. Based on the amount of force F 1 and F 2 (in pounds), the substrate 264 and the sensor 262 will deflect about the deflector mechanism 260. With larger forces F 1 and/or F 2, the deflection is greater. Thus the sensor 262 can be seen to deflect from an at-rest position shown in dotted line as 262 A to a first position in which the sensor 262 is shown in solid line a radial deflection distance of dB. With a greater force, the deflection will be greater so that the sensor 262 is now in a position shown in dotted line as 262 B, and the sensor 262 can be said to be displaced a radial distance of dC. With even greater force the deflection of the sensor 262 will increase so that the sensor is now in a position shown in dotted line as 262 C, and the sensor 262 will now have been displaced a radial distance of dD. The electrical resistance of the sensor 262 predictably changes with the displacement as shown in FIG. 9. In other words there is a correlation between the degree or amount of deflection or the degree of downward force being exerted and the electrical resistance of the sensor 262. As will be seen later, the amount of downward deflection (e.g., dB, dC, dD) will reflect certain practical forces that will be experienced for different kinds of masses (e.g., a child, an adult male, a car seat).

For many arrays such as the array 210 of FIG. 6, there are about 20 to about 30 sensor leaves each having a sensor. Preferably the number of sensor leaves is 26 or 28 with each providing an analog (e.g., a signal reflective of resistance or change in resistance) output to the terminal for further transmission to the operation means (e.g., 24 in FIG. 1). A terminal circuit (e.g., circuit 24 in FIG. 1) is discussed more fully hereinafter.

Figure 10:
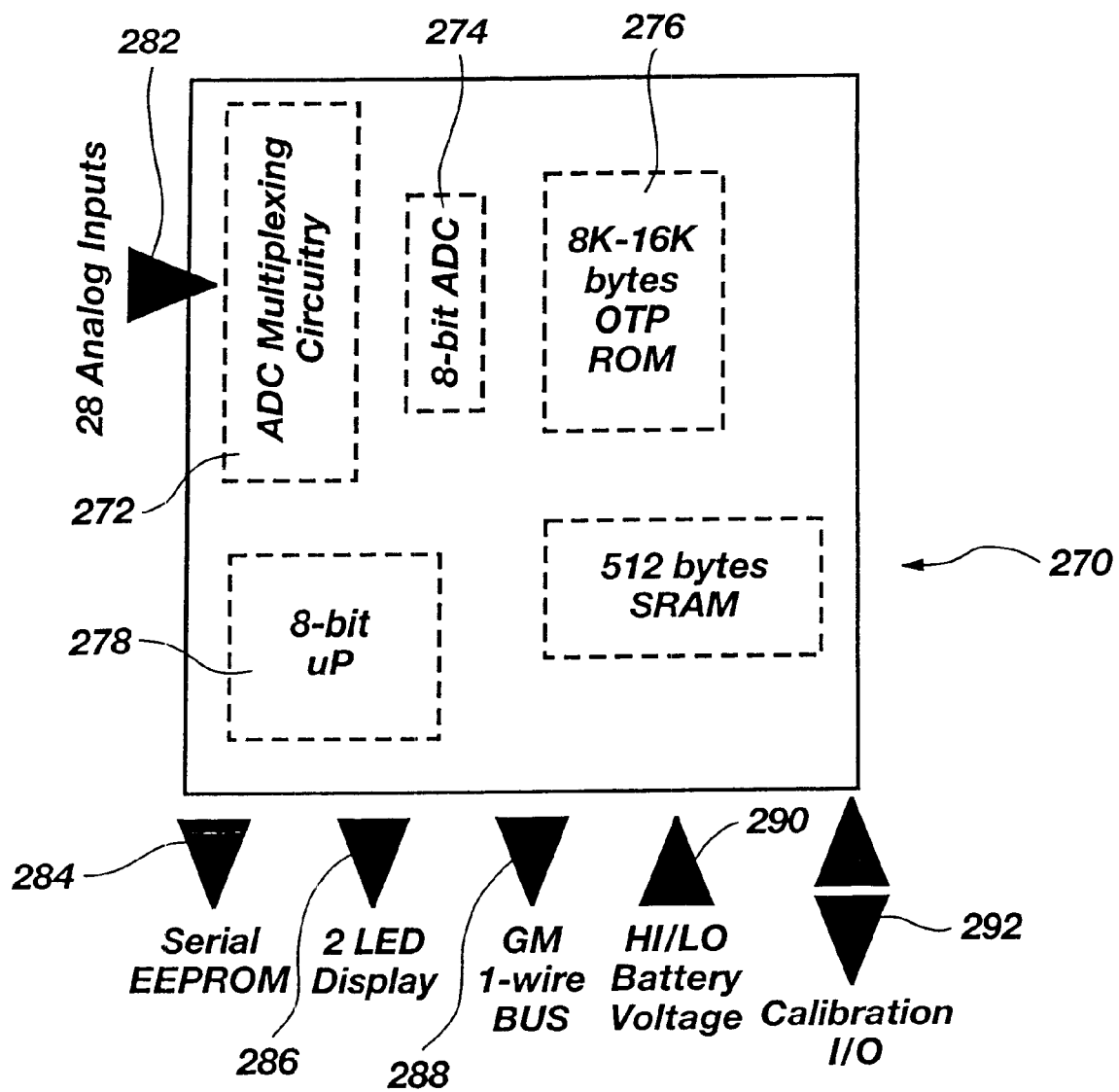
FIG. 10 is a depiction of an application specific integrated circuit (ASIC) of the present invention.

The operation means may be configured to receive signals directly from the sensors and will include an ASIC 270 (Application Specific Integrated Circuit) depicted in FIG. 10 in block diagram format. The ASIC 270 includes an analog to digital converter (ADC) 272 which also is configured to supply multiplexed signals to an 8 bit analog to digital converter 274. The A/D converter 274 supplies signals to an 8 bit micro processor 278. The ASIC 270 also has 512 bytes of SRAM 280 and 8 kilobytes to 16 kilobytes of OTP ROM 276. The ASIC 270 receives the analog input from the several sensors from the terminal via appropriate conductors 282 while supplying a serial EEPROM signal 284 and a signal to an LED display 286. The ASIC 270 also supplies a signal to a one wire GM (General Motors) bus 288. Power is provided along with a high/low signal at input 290; and a calibration signal is provided at output 292. Alternately the operation means may be configured to receive signals from the terminal circuit such as terminal circuit 24 discussed in more detail hereinafter.

Figure 11:
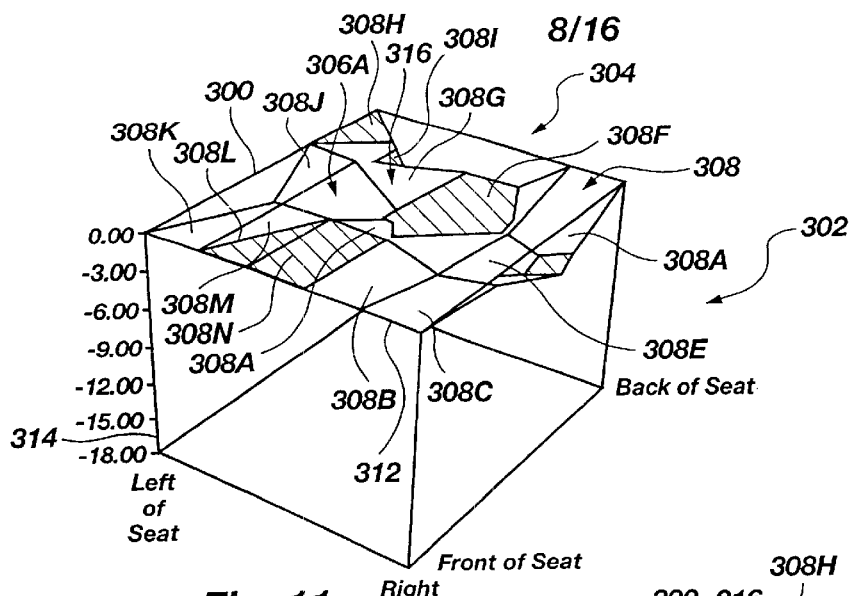
FIGS. 11–13 are depictions of deflection of a substrate for a mass such as that of a 62-pound male.

Turning now to FIG. 11, the surface 300 of a theoretical automobile seat 302 is depicted in two positions. In the first position 304, the surface 300 is a flat plane with no depressions from any person or object (i.e., a mass, not shown) on the seat 302. In the second position 306, the surface 300 has been deflected to different degrees in different locations to reflect the positioning of a mass on the seat 302. In FIG. 11, the mass positioned on the seat is a 62-pound male with no seatbelt in a sitting posture.

The surface 300 of the seat 302 in FIG. 11 is divided into a plurality of sectors 308 each of which is deflected either not at all or to one degree or another from the force or weight (mass) of the 62-pound male positioned on the seat 302. Thus, sector 308 A is not deflected when normally seated; but sectors 308 B–308 N are deflected. Each of the sectors 308 A–N may be said to have a point through which the force $F_s$ 310 (integrated over that sector) is acting. A sensor such as, for example, sensor 262 is positioned relative to each of the seat sectors 308 A–N to sense the force, such as force $F_s$ 310, which is exerted downward in those sectors based on the mass distribution or profile of a 62-pound male seated normally in the seat. That is, the 62-pound male presents a "footprint" or indentation that the male person makes on the seat that reflects the configuration of the portion of the body on the seat surface 300. Stated alternately, when a person is positioned on a seat, the mass is not distributed evenly over the surface and the forces are exerted downwardly across the entire surface area. However, it would be impractical to have a very large number of sensors (e.g., hundreds to thousands) to sense the downward forces across the entire surface area. Even with a very small unit area approximation for each downward force (e.g., 1 centimeter), the number of sensors would be impractical and also unnecessary. Rather the size of the unit area can be quite notable (e.g., from about 8 square inches to about 25 square inches and preferably from about 14 square inches to about 16 square inches) while still providing sufficient indication of the mass in different locations so that the signals can be used as an indication of the "footprint" or profile of the mass on the seat.

When seated normally, the gluteus maximus of the male is normally positioned on the seat 302. That is, the person is seated with his spine resting against or proximate the back of the seat and with a portion of male's upper legs extending over the front edge 312. The weight or mass of the male is thus distributed over the surface 300 with the individual forces, such as force $F_s$ 310, in each sector 308 A–N being reflected by the degree of indentation on the scale 314 that is present as a "Y" axis on the left front corner of the seat 302. Stated alternately, when a person is positioned on a seat, the mass is not distributed evenly. The different forces $F_s$ in each sector are assumed to be concentrated through a specific point in each sector 308 A–N. Of course the forces are typically different over the entire area of the sector so that one is really making an approximation or assumption sufficient for the purpose of developing enough information to determine what is positioned in the seat. The greater the accuracy desired, the greater the number of sensors and sectors. Advance testing for typical persons or things for each seat will provide the pattern or profile for those persons or things (e.g., masses). The information from the advance testing can be retained in a computer memory to provide a basis for comparison as more fully discussed hereinafter.

The scale 314 in FIG. 11 shows the reflect deflection in units for the several sectors 308 A–N. A unit will vary with the type of seat 302. That is, the absolute distance in inches that the seat surface 300 travels at it transitions from the first position 304 to the second position 306 A in each of the several sectors 308 A–N will vary based on the nature of the surface (e.g., cloth, leather, plastic, naugahide, other), the nature or type of underlying seat structure including, for example, the presence or absence of springs in addition to the mass of that which is positioned on the seat 302. Thus, the value of a unit would be empirically selected for each type of seat and based on the information desired for submission to a particular operation means such as operation means 24 in FIG. 1.

Typically, a car seat will not depress a significant distance. That is, the seat surface 300 may depress in a given sector from about ½ inch to about 2 inches. The amount of travel selected to equal a unit is selected to obtain a desired degree of resolution for a desired operation means. That is, if a seat were to depress a maximum of 1 inch in three sectors for a given mass and a deflection unit equaled 1 inch, the pattern for that mass would involve only three sectors. However, the same mass could produce measurable defections in several more sectors if the deflection unit were selected to be ½ inch. In turn, the profile information for that mass would be more accurate based on what information was selected by the operation means since the signals are available from the several sensors.

In FIG. 11, the scale 314 shows a potential deflection of 18 units. The total scale is misleading to some extent because the maximum deflection for seat such as seat 302 would typically be from about one fourth to about three fourths and preferably about half of the scale. By inspection in FIG. 11, it can be seen that the deflection does not appear to exceed five units for any one sector.

Figure 12:
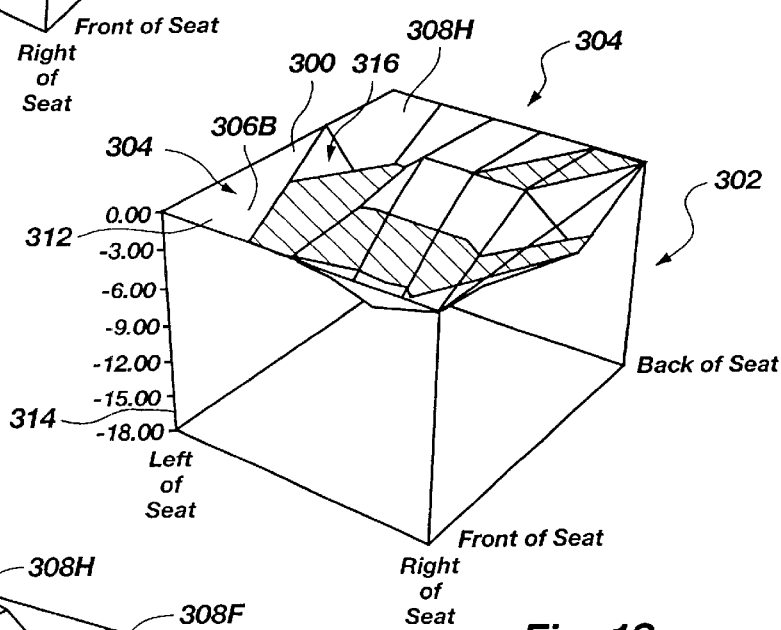

The 62-pound male in FIG. 11 could also select a different position on the seat 302 by sitting on the edge of the seat, squirming about, leaning to one side, by sitting in the middle with his back displaced from the seat back, or positioned in some other orientation. FIG. 12 shows a typical profile or pattern for the sectors 308 A–N with the 62-pound male unbelted and sitting in a middle position. That is the surface 300 moves from the at-rest or non-depressed position 304 or first position to what is here stated to be a third position 316. The third position is so denominated to make sure that it is not confused with the second position in FIG. 11 even though the third position is in effect the second or depressed position of the surface 300 with the 62-pound male (mass) positioned as stated. A different profile or pattern for the several sectors 308 A–N can be seen.

Figure 13:
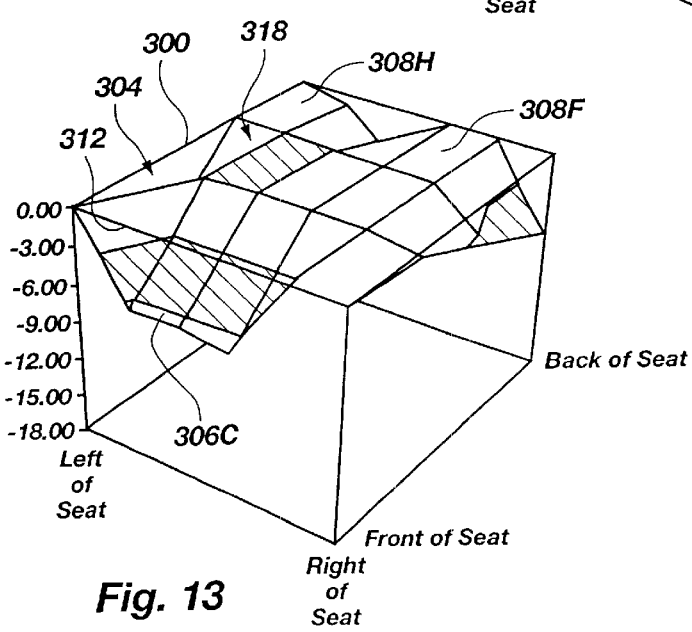

In FIG. 13, the 62-pound male is positioned near the front or proximate the front edge 312 of the seat 302. Here again the surface 300 moves from the no depression or atrest position 304 to a depressed position 318. Again a different pattern or profile of depression of the several sectors 308 A–N can be seen. Even the number of units in which the seat moves or deflects in a given sector changes and here can be seen approaching nine.

In FIGS. 11–13, the deflection illustrated is exaggerated for purposes of illustration. The amount of deflection will vary with the construction of the seat and the seat surface. It should also be noted that in certain selected positions on the seat 302 for the 62-pound male, the air bag activator 32 (FIG. 1) desirably may be "armed" and ready to deploy the air bag 40 (FIG. 1). In yet other positions, it may be desired to disarm or disable the air bag activator 32 so that it cannot deploy the air bag 40 in the event of a sudden deceleration or acceleration. For example, if the 62-pound male is not sitting, but rather kneeling, in the seat and looking over the rear of the seat, a decision could be made to not arm or disarm the air bag system. The operation means is configured to select desired signals reflective of a profile or profiles that is determined by the user to be one in which the system is to produce an "armed" output signal. Further, inasmuch as the mass 50 (FIG. 1) is a 62-pound male, it may be desirable to adjust or reduce the force of the gas entering the air bag 40 as it expands rearwardly toward the 62-pound male to reduce the force of the air bag 40 imposed on the 62-pound male. The use of sensors in multiple sectors 308 provide signals reflective of the profile of the mass in or on the seat 302 in a format so that appropriate decision logic can be applied to activate or deploy or not activate or not deploy the air bag 40 as desired.

Figure 14:
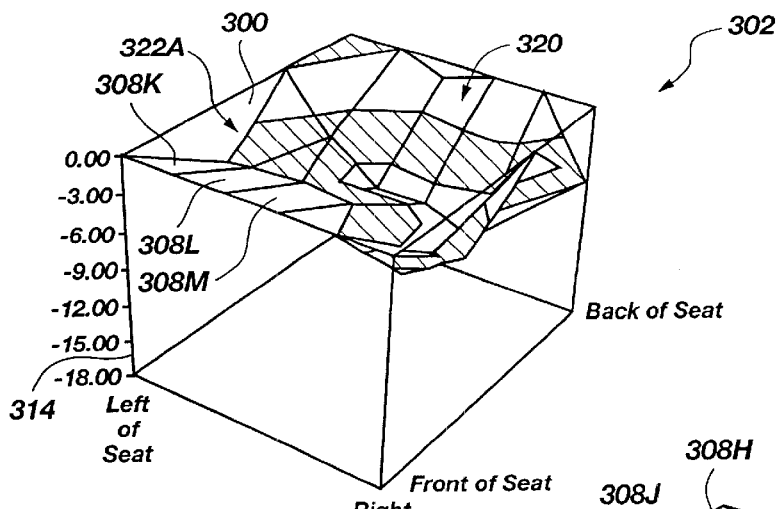
FIGS. 14–16 are depictions of deflection of a substrate for a mass such as that of a 95-pound female.
Figure 15:
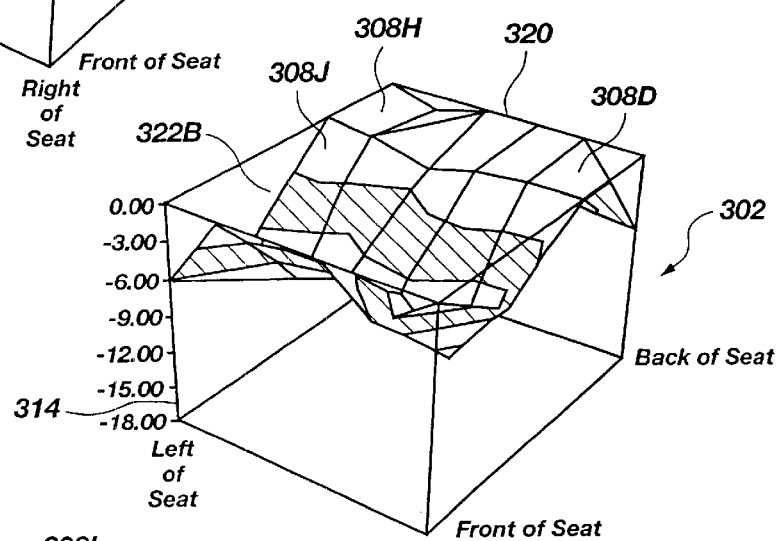
Figure 16:
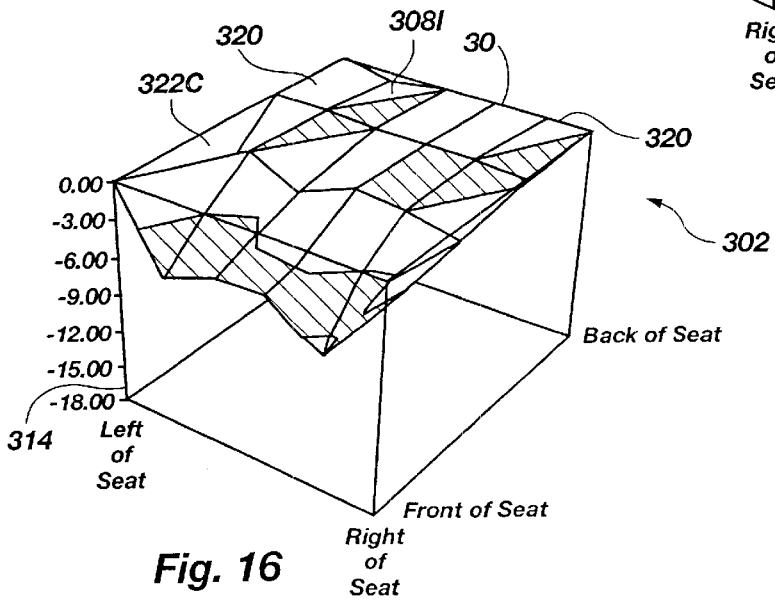

FIGS. 14–16 show the same seat 302 with a surface 300 that has sensors in an array comparable to one of those shown in FIGS. 2–4 and 6 positioned under the various sectors 308 A–N. The surface 300 deflects between a first position 320 and a second position 322 A (FIG. 1), 322 B (FIG. 15) and 322 C (FIG. 16) for a 95-pound female positioned at different positions in the seat 302. Again, it can be seen that the sensors provide signals reflective of the profile so that appropriate decision logic can be applied to determine whether a signal to deploy or not deploy the air bag is to be generated.

Figure 17:
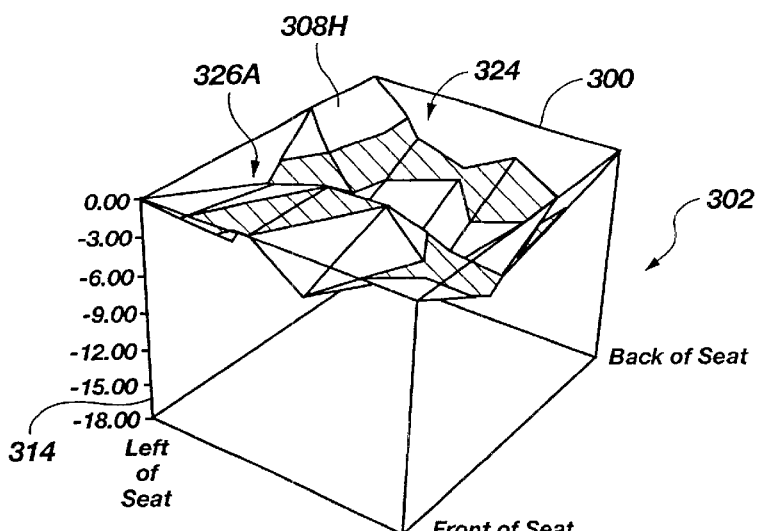
FIGS. 17–19 are depictions of deflection of a substrate for a mass such as that of a 120-pound male.
Figure 18:
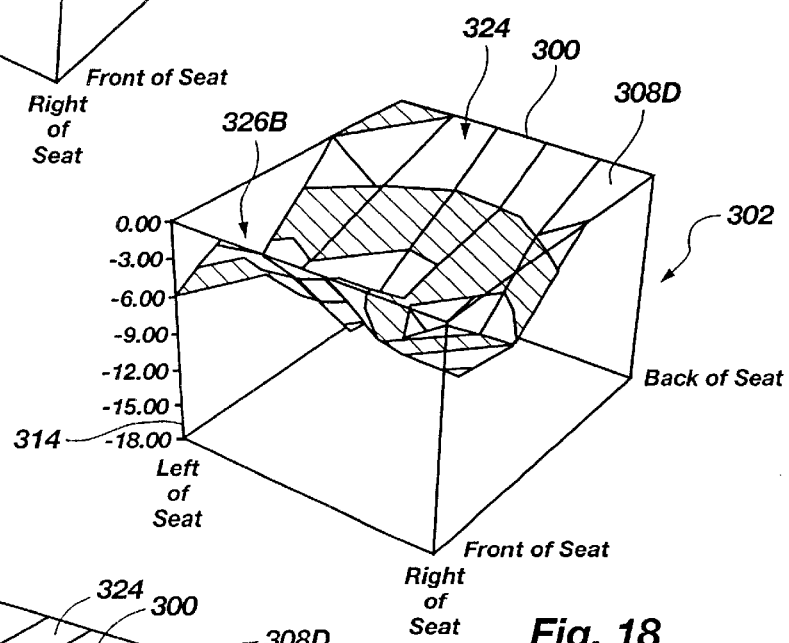
Figure 19:
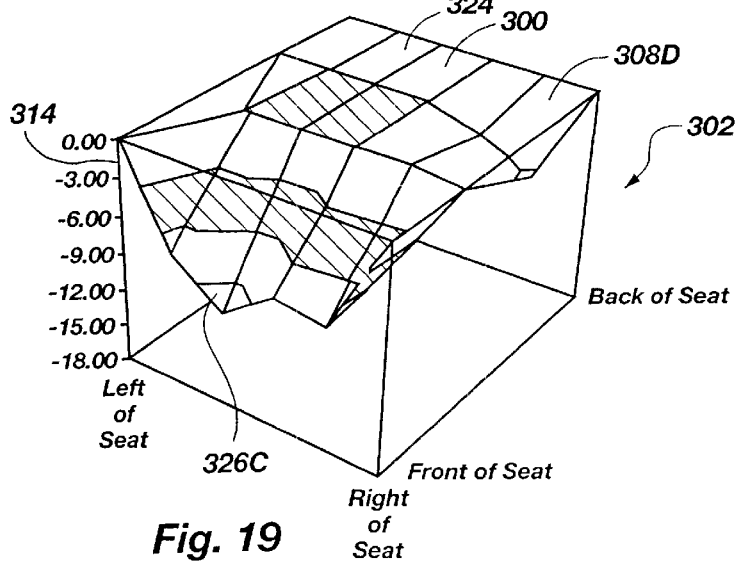

FIGS. 17–19 show the same seat 302 with the surface 300. Sensor leaves comparable to the sensor leaf 230 of FIG. 7 in an array comparable to an array such as that of FIGS. 2–4 and 6 are positioned under the surface 300. The surface 300 deflects between a first position 324 and a second position 326 A (FIG. 17), 326 B (FIG. 18) and 326 C (FIG. 19). The mass on the seat 302 is a 120-pound male positioned in different locations to produce signals from the sensors reflective of the position and in turn the profile of the mass. In turn, decisions to activate or not activate or to reduce the gas pressure (when available) can be made by computer comparisons to known profiles.

Figure 20:
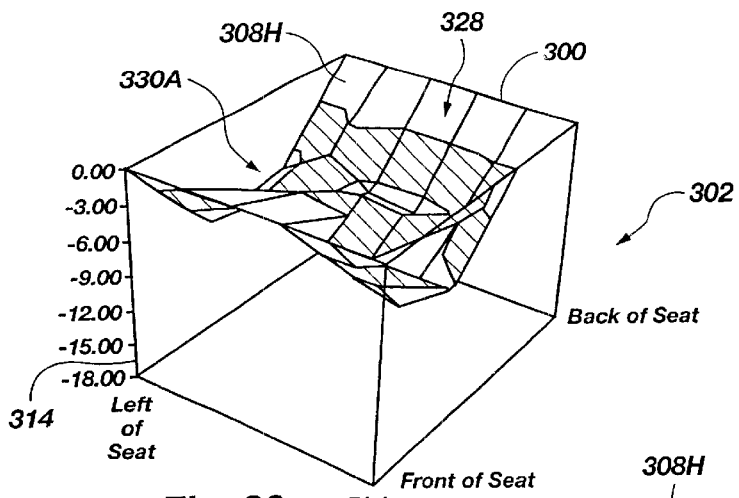
FIGS. 20–22 are depictions of deflection of a substrate for a mass such as that of a 170-pound male.
Figure 21:
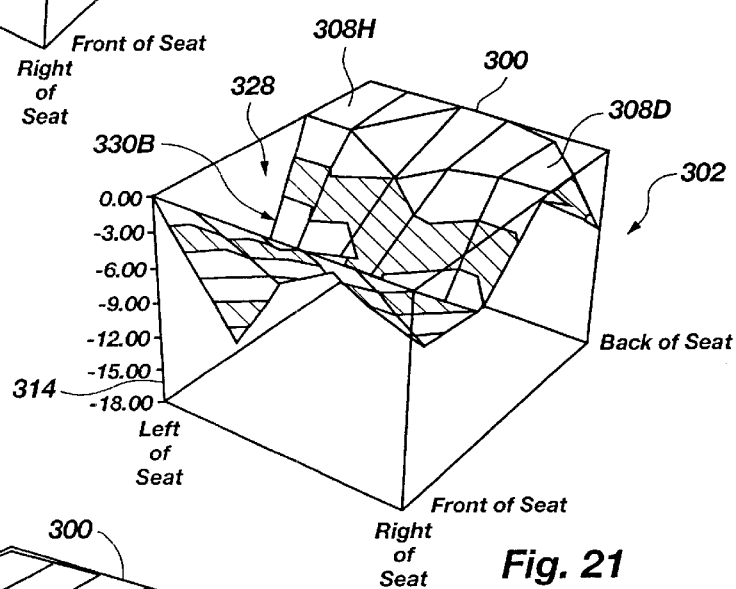
Figure 22:
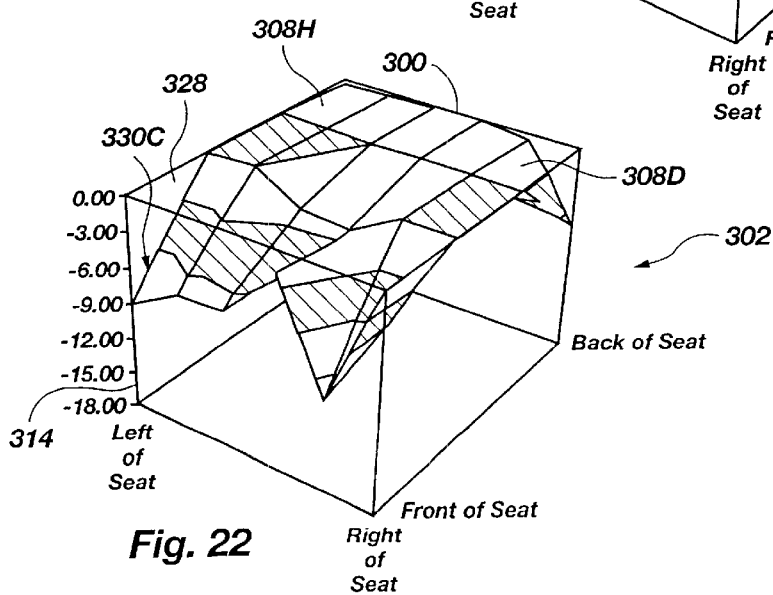

FIGS. 20–22 show the seat 302 with the surface 200 in a first position 328 and in a second position 330 A (FIG. 20), 330 B (FIG. 21) and 330 C (FIG. 22) for a 170-pound male in different positions on the seat 302.

Of particular interest are the signals reflecting the profile of a car seat 332 for carrying a small child. Car seats come in a wide variety of sizes and shapes. It is presently viewed as the preferred device for transporting babies and very small children in an automobile. That is, car seats such as car seat 322 (FIG. 24) are configured so that the seat belt of the automobile can be manipulated to lock the car seat into position on the seat such as seat 302. In effect, the seat belt 334 for that seat or position can be hooked about the car seat 332 to in effect strap it securely in position on seat 302. The car seat 332 may have a hook 336 so the seat belt 334 may adapt to and in turn hold the car seat 332 securely. The car seat 332 here illustrated is not intended to represent any known make or brand or reflect what style, shape or form is recommended or required by various governmental authorities. Rather, the car seat 332 is not intended to reflect use of any non approved or not recommended car seat. Further the car seat 332 represents any type of structure used for children or small people including booster seats.

Figure 23:
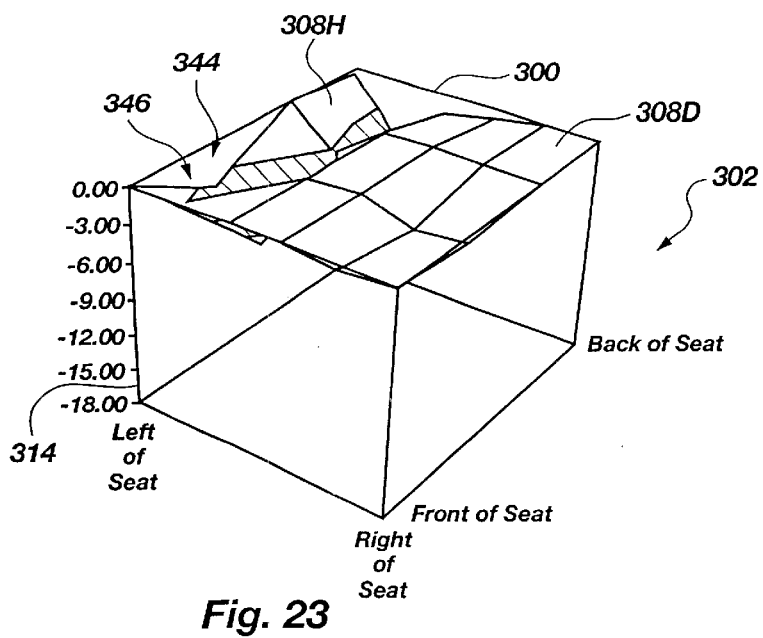
FIGS. 23 and 24 are depictions of deflection of a substrate for a mass such as that of a child carrying separate car seat or carrier in both an empty and weighted condition.

The car seat 332 will present a particular footprint when it is positioned on the seat 302. That is, any child car seat will have some configuration of feet or legs which will vary from model to model. The car seat 332 is shown with legs 338, 340 and 342 as but one example of available combinations. When positioned on the surface 300, the legs of a car seat will produce a particular footprint. As can be seen in FIG. 23, the legs 338, 340 and 342 of car seat 332 or comparable supports of other styles of car seats will cause the surface 300 to move from an at-rest or empty configuration 344 to a depressed or second condition 346 which reflects the footprint of the car seat 332 when it is empty. The seat 302 has a sensor array such as that of FIGS. 2–4 and 6 and produces trigger signals which reflect the total mass of the car seat 332 as well as a profile to reflect its position and its identity.

Figure 24:
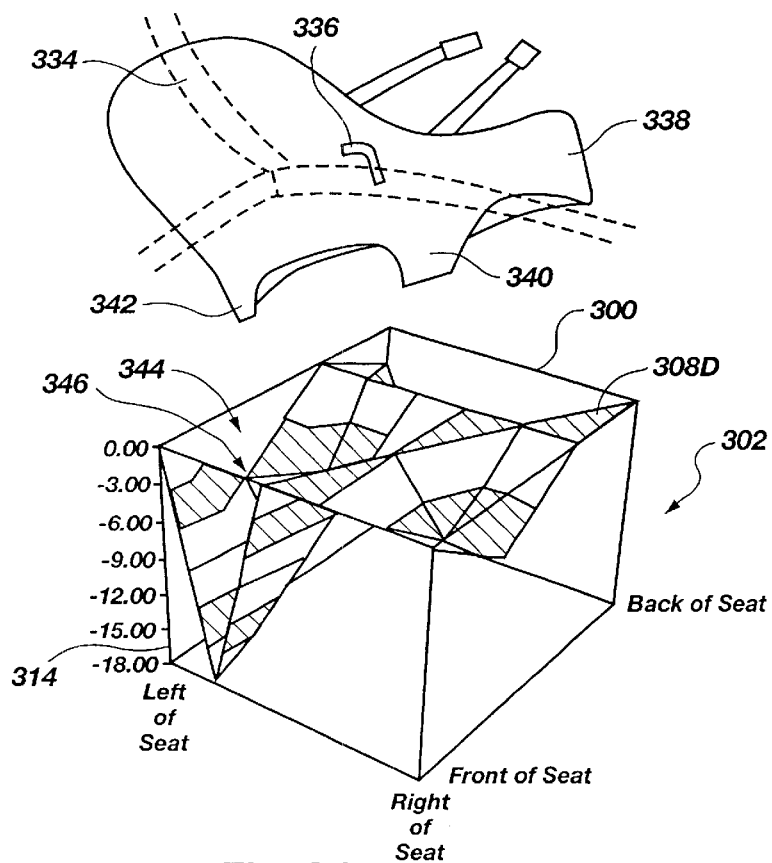
Figure 25:
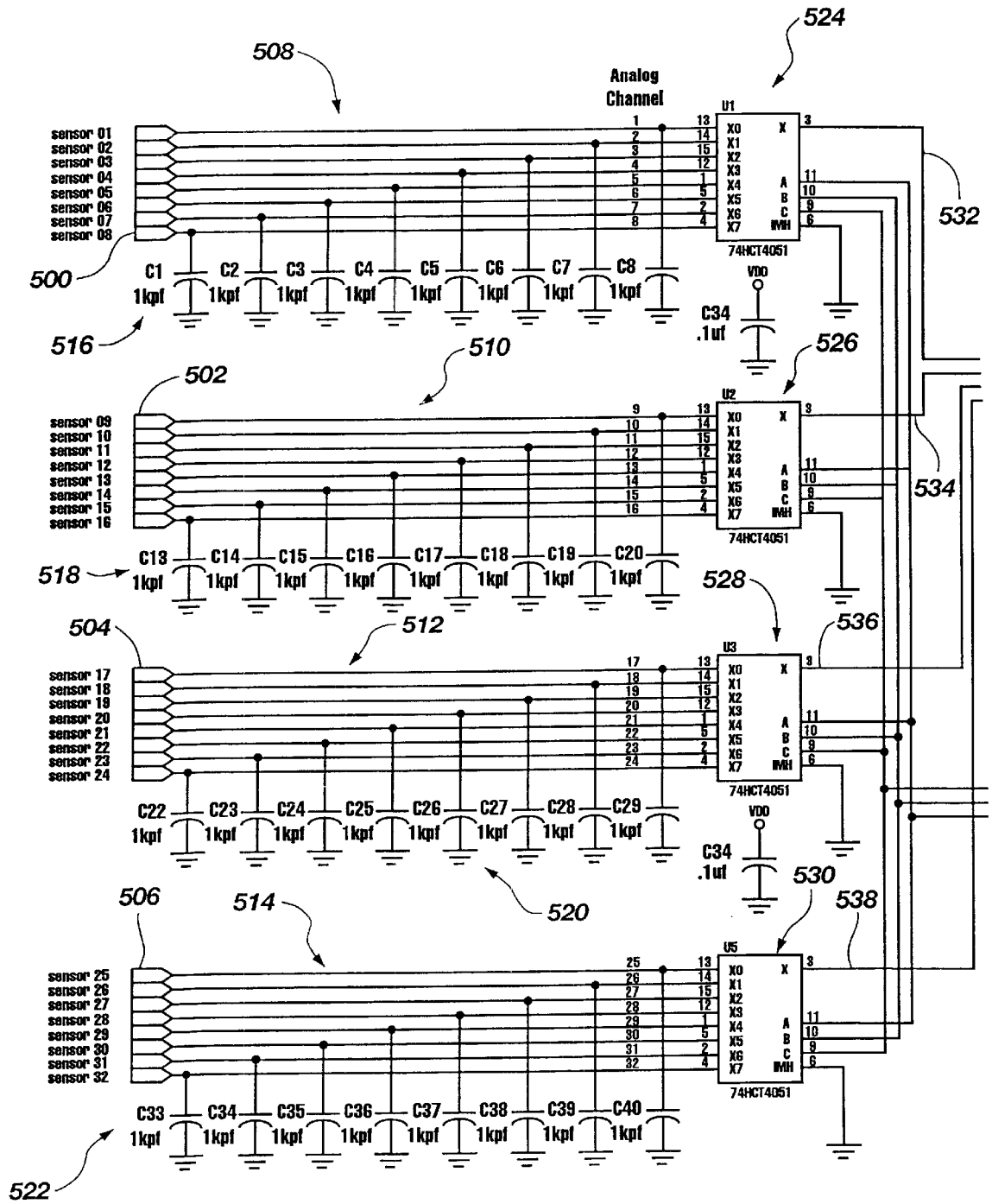
FIGS. 25–28 are circuit diagrams for a terminal circuit for use with the present invention.

FIG. 24 shows the seat 302 with the car seat 332 spaced above for clarity. The car seat 332 has a 40-pound child in it so that it produces a particular series of signals that reflect the profile. More specifically EVENFLO™ model 225167P has been used to reflect the profile observed in FIGS. 23 and 24.

Of course FIGS. 11–24 are representative of different profiles of a mass such as an object or person found in a typical seat for an automobile or other vehicle such as seat 302. A different output signal from the sensors in the several sectors would reflect a profile that would differ for persons of different sizes and shapes. Objects that could be found on a front passenger seat include groceries, a lady's purse, a brief case, a box, and the like, would also produce a different profile. The operation means such as operation means 24 (FIG. 1) will contain desired logic to effect comparisons with known standards and cause one to generate arm or disarm signals as desired.

Turning now to FIGS. 25–28, a terminal circuit suitable for use with the instant invention is illustrated. Input from groups of sensors is received through connector banks 500, 502, 504 and 506. The sensor inputs are supplied via conductors 508, 510, 512 and 514 through 1K pico-farad filters 516, 518, 520 and 522 to multiplexers 524, 526, 528 and 530 such as the 74HCT4031 multiplex chips illustrated.

Each multiplexer 524, 526, 528 and 530 has an output that is supplied via conductors 532, 534, 536 and 538 respectively to a voltage divider 540. The voltage divider directs the output of a multiplexer through 54 kilo-ohm resistors via conductors 542–545, through 36 kilo-ohm resistors via conductors 547–550 and also directly via conductors 552–555 all to micro controller ($\mu c$) 558 such as the MC68HC912B32CFU chip illustrated in FIG. 26 which has imbedded in it an analog to digital converter (A/ID). The output from the multiplexers 524, 526, 528 and 530 sent to the voltage divider 540 is also directed to a grounded line filter circuit shown in FIG. 27 to be 100 pico-farad capacitors.

Figure 26:
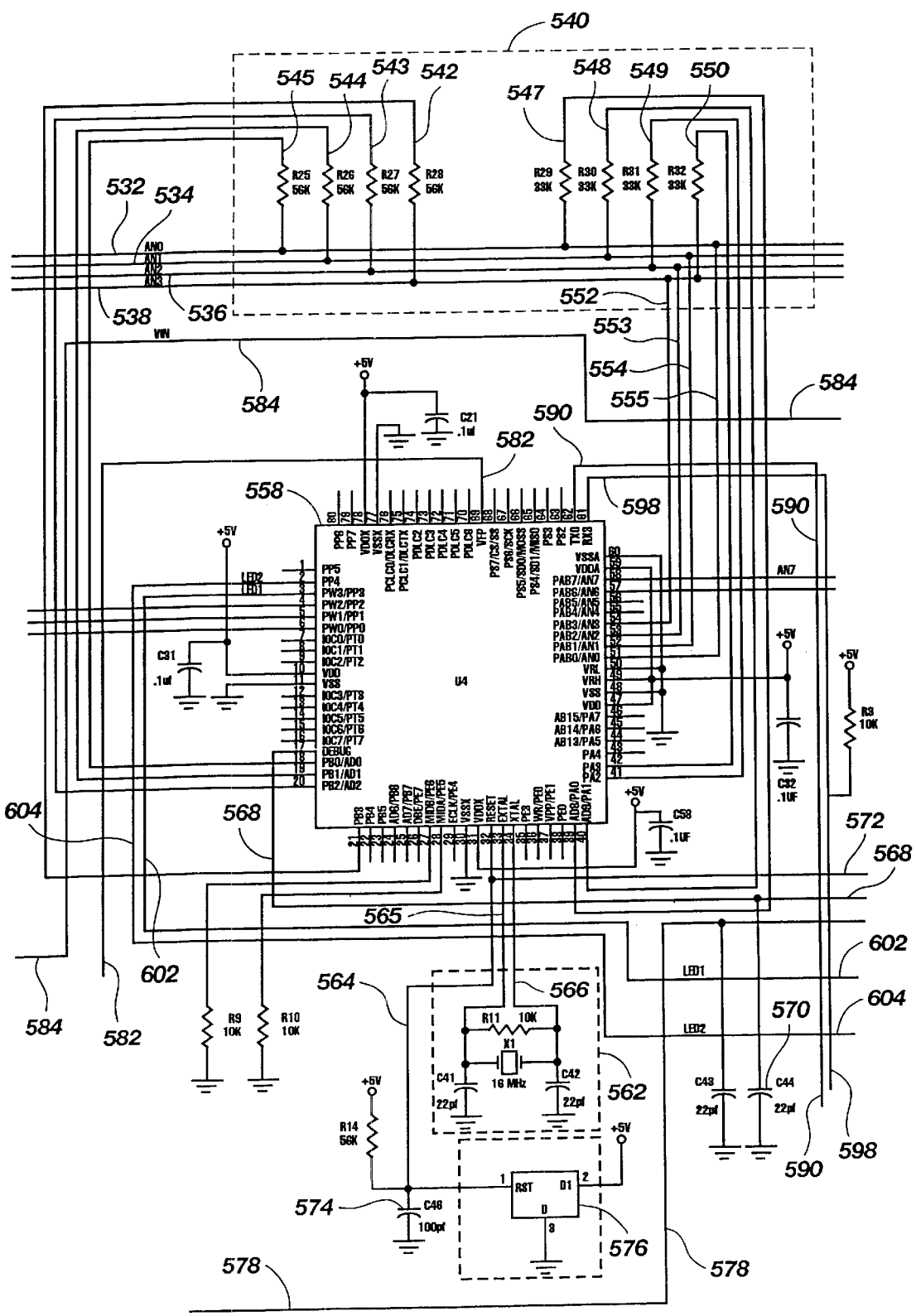

The micro controller 558 is shown with a clock circuit 562 connected via conductors 565 and 566. The micro controller 558 also receives a test or debug input via conductor 568 (FIG. 27) which input is also filtered by what is here shown as a grounded 22 pico-farad capacitor 570 (FIG. 26). A reset signal is supplied to the micro controller 558 via conductor 572. The reset signal is filtered by a 100 pico-farad capacitor 574 via conductor 565 and is also supplied to a reset circuit 576 such as circuit or chip MC33064P-5 shown in FIG. 26.

A programming signal is supplied via conductor 578 (FIGS. 26 and 27) to a programming circuit 580 to program the micro controller 558 via conductor 582.

The terminal circuit of FIGS. 25–28 receives power from a source such a separate battery or the vehicle battery and supplies it via conductors 584 to a battery voltage sensor and a temperature sensor circuit 586. The temperature sensor circuit supplies signals to the micro controller 558 via conductor 587 reflective of the temperature and battery condition. The power is also supplied via conductor 588 to a power supply 590. The circuitry showing power distribution is not shown for clarity.

Figure 27:
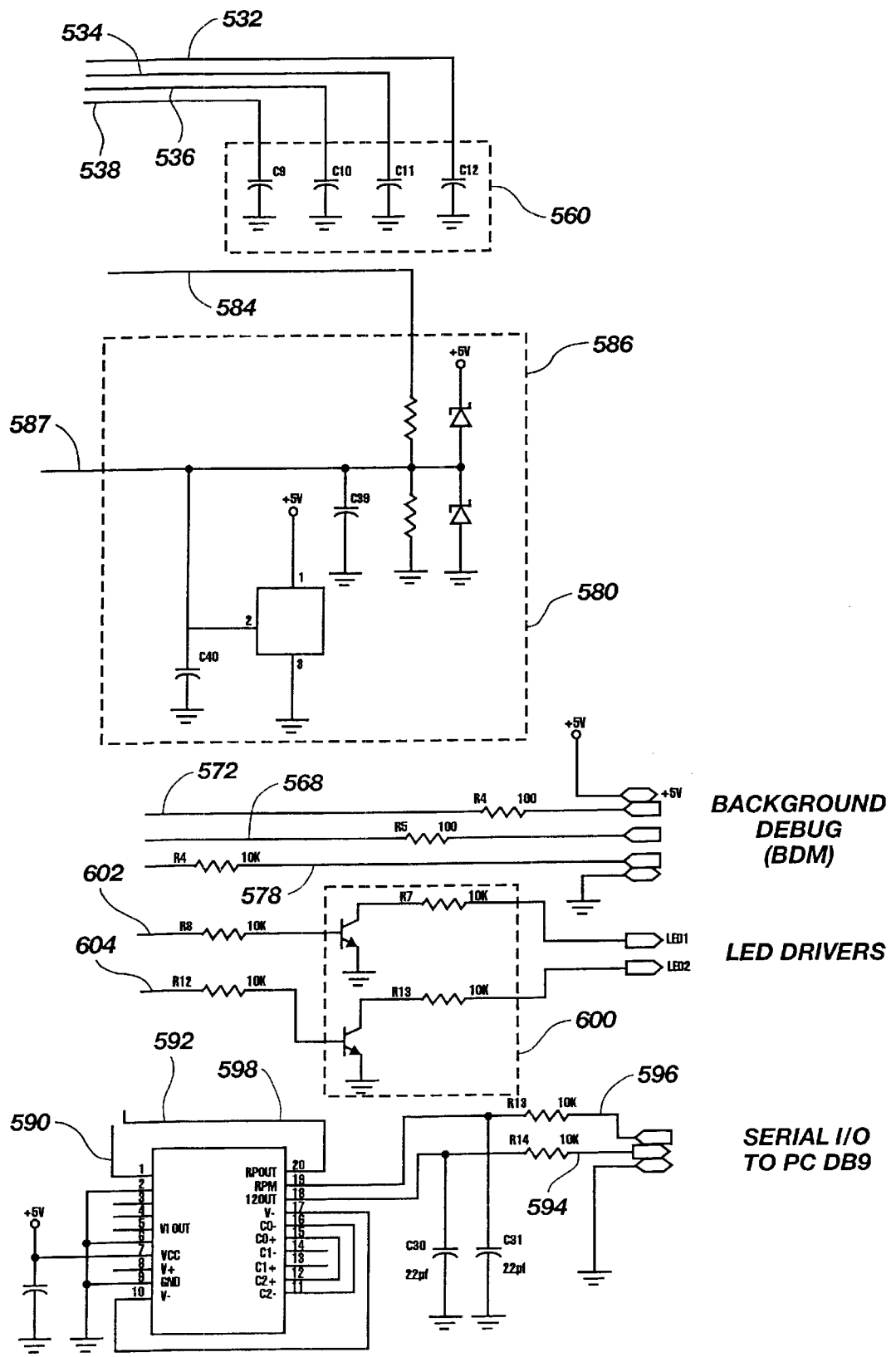
Figure 28:
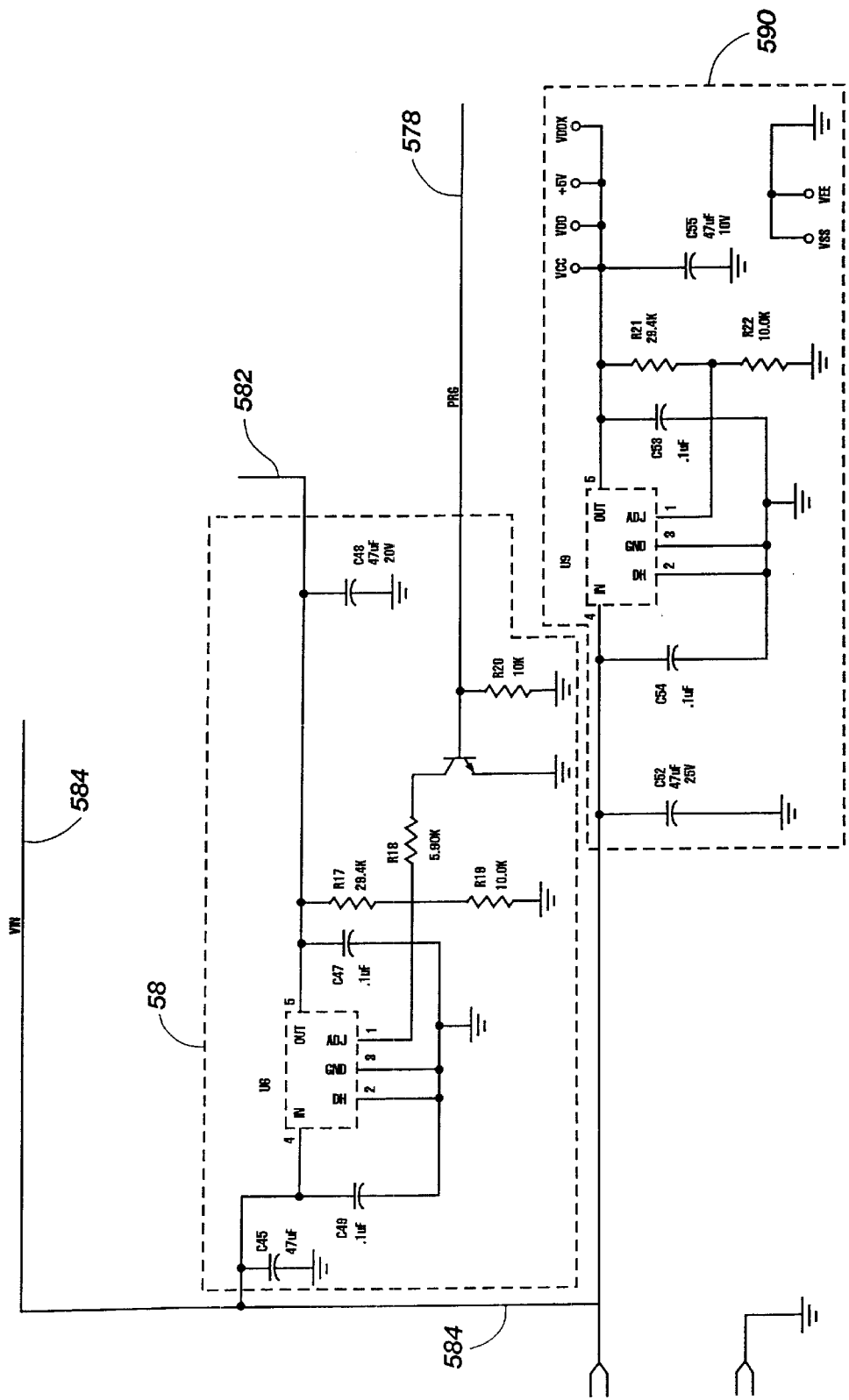

The micro controller 558 supplies an output digital signal via conductor 590 to a communications chip 592 such as chip MAX 233AEWP shown in FIG. 27. The digital signal is processed to a desired form and then supplied to an output via conductor 594. A control signal may be received from outside the via conductor 596 and supplied through the communications chip 592 to the micro controller 558 via conductor 598. Specifically the micro controller 558 supplies its digital output to an exterior component which is typically a computer or chip that sends back signals to regulate the transmission of those signals to match when the computer or chip is ready to receive them.

The micro controller 558 also supplies signals to an LED driver circuit via conductors 602 and 604. That is, the micro controller 558 generates signals to operate LEDs remotely positioned to indicate the presence or absence of desired signals. For example, an LED could be illuminated to indicate the presence of signals that enable or arm the air bag.

In operation, it should be understood that the signals from the sensors are not continuously read but rather sampled periodically at a rate. In the illustrated embodiment, the inputs 532, 534, 536 and 538 are sampled (in groups of 8) every 16 mili-seconds. The output is supplied to a PC or chip such as a MOTOROLA HC 08 or HC 12. The PC or chip is programed as desired to receive the digital input and compare it with known data developed empirically to determine what is on the seat, if anything, and determine if the air bag system should be enabled or armed or configured to deploy.

In programming, it has been found that different seats have different construction and in turn different stiffness and at different points and different overall stiffness. Empirical data can be developed for each kind or type of seat. Thus a base line can be devised so that with temperature, with wear and tear on the seat, and with similar factors that could or do impact on the physical performance of the seat, the output signals being received later can be understood relative to the base line.

The operation means 24 (FIG. 1) contains the PC or chip which is programmed to react to signals incoming that reflect or distinguish between different objects or masses on the seat. For example, empirical data may be developed for humans of different ages and weights, for car seats, for booster seats, for grocery bags, for purses, for pets, for umbrellas and many other objects. A selection can be made as to when a deploy signal would be desired and when such a signal would not be desired. For example, one could conclude that signals indicative of a car seat or booster seat must yield a do-not-deploy signal or condition. The operation means may be configured to generate a do-not-deploy signal for all conditions except those where it is clear that a deploy signal is desired. Thus, the operation means 24 would be configured or programmed to supply deploy signals only for signals from the sensors that reflect a human of a particular minimum size or bigger. The operation means 24 is thus configured to be programed to supply signals to deploy or not deploy consistent with selections or protocols to produce what the user believes to be the desired decision logic.

The operation means 24 may, for example, contain a quantity of pattern filters to recognize the different patterns of the different masses positioned on the seat. That is, in addition to evaluating a total mass, a pattern filter may identify profiles and in turn be an element that is considered by the PC in generating a deploy or do-not-deploy signal.

In some cases, vehicles may be equipped with a safety device module. The module is connected to receive input from the terminal such as terminal 20 and to supply deploy and do-not-deploy signals to the air bag gas generator. The safety device module may contain a PC/chip or other structures selected to process the signals from the terminal such as terminal 20. The safety device module may have input from other detectors sensing something else that would impact on whether a deploy or do-not-deploy signal is to be supplied.

For example, a separate mat 47 similar to mat 14 may be placed in the back 43 of seat 16 to sense pressure from a reclining occupant or mass and supply signals to the same terminal 20 or to a different terminal similar to terminal 20 to in turn supply signals to the operation means 24 or safety device module to further reflect the profile, nature and location of the mass. In addition, detectors reflecting interior temperature of the vehicle may supply signals to the operation means or safety device module to disable or disarm the air bag system.

It is to be understood that the details of the above-described illustrated embodiments are not intended to limit the scope of the claims which recite those features regarded as essential to the invention.

What is claimed is:

1. A detector for positioning proximate to a support surface having a plurality of sectors, said detector being operable for detecting a force being applied at one or more locations of a plurality of spaced apart locations on said support surface, said detector comprising:

a sensor mat for positioning proximate to a support surface having a plurality of sectors which support surface is deflectable at a plurality of spaced apart locations, each of said sectors having one location of said plurality of locations therewithin, said sensor mat having a flexible and deflectable substrate positioned to be mechanically deflected upon mechanical deflection of said support surface at said plurality of spaced apart locations on said support surface upon application of a force to said support surface at each of said plurality of locations, said sensor mat being formed to have a plurality of sensors spaced apart and each positioned to sense the mechanical deflection of said support surface at one location of said plurality of spaced apart locations, each sensor of said plurality of sensors of said sensor mat being positioned proximate the said one location in each said sector of said plurality of sectors, and each sensor of said plurality of sensors being of the type which predictably changes electrical resistance upon the deflection thereof by application of a force thereto and said substrate of each said sensor of said plurality of sensors extending longitudinally with a longitudinal axis and being configured to deflect about a transverse axis which is transverse to said longitudinal axis of said substrate upon application of the force to said location in its respective sector, an electrically conductive composition being deposited on said substrate to be deflected with said substrate about said transverse axis;

conductor means connected to each said sensor of said plurality of sensors to supply electrical power thereto and connected to said each sensor of said plurality of sensors to transmit therefrom signals reflective of said changes in said measurable electrical resistance of each sensor of said plurality of sensors, said conductor means including a trunk member with a plurality of branch members extending therefrom with said branch member being formed to have at least one sensor of said plurality of sensors;

a deflector mechanism positioned relative to each sensor of said plurality of sensors for contacting and deflecting a respective said sensor upon application of said force in said sector of said support surface; and terminal means conductively connected to said conductor means for electrical connection to a source of electrical power for receiving and supplying electrical power to said sensor mat and for electrical connection to an external circuit configured to receive signals reflective of said changes in the measurable electrical resistance of said one sensor.

2. The detector of claim 1 wherein said deflector has a longitudinal axis generally in alignment with said transverse axis.

3. The detector of claim 2 wherein said substrate has a width, wherein said deflector is shaped to act as a fulcrum about which said substrate deflects upon application said force at said location, said deflector being sized to extend substantially the width of said substrate.

4. The detector of claim 3 wherein said deflector is cylindrical in shape.

5. The detector of claim 1 wherein said support surface includes the outer material layer of a seat structure for use in a vehicle.

6. The detector of claim 1 wherein said support surface includes the back material layer of a seat structure.

7. A detector for positioning relative to a support surface, said detector being operable for detecting a pressure applied at one or more locations of a plurality of spaced apart locations on said support surface, said detector comprising:

a sensor mat for positioning relative to said support surface which support surface is deflectable at a plurality of spaced apart locations, said support surface having a plurality of sectors each having one location of said plurality of locations therewithin, said sensor mat having a flexible and deflectable substrate positioned to be mechanically deflected with said support surface at each location of said plurality of spaced apart locations upon application of pressure to said support surface at least one location of said plurality of locations, said sensor mat being formed to have a plurality of sensors in an array each spaced apart and each positioned with a portion for mechanical deflection upon the deflection of said support surface at each location of said plurality of locations and each sensor of said plurality of sensors being of the type which predictably changes electrical resistance upon mechanical deflection of a portion thereof, said array being generally rectilinear in projection, each sensor of said plurality of sensors of said sensor mat having a portion positioned proximate one sector of said plurality of sectors of said support surface, said substrate of each said sensor of said plurality of sensors extending longitudinally with a longitudinal axis and configured to deflect about a transverse axis which is transverse to said longitudinal axis of said substrate upon application of said pressure to said location in its respective sector, and an electrically conductive composition being deposited on said substrate to be deflected with said substrate about said transverse axis;

conductor means connected to each sensor of said plurality of sensors to supply electrical power thereto and to transmit therefrom signals reflective of changes in said measurable electrical resistance of each sensor of said plurality of sensors, said conductor means including a trunk member with a six branch members extending therefrom with each said branch member being formed to have at least one sensor of said plurality of sensors; and terminal means electrically associated with said conductor means for electrical connection to a source of electrical power for receiving and supplying electrical power to said plurality of said sensors and for electrical connection to an external circuit configured to receive signals reflective of the changes in the measurable electrical resistance each sensor of said plurality of sensors.

8. The detector of claim 7 wherein each sensor of said plurality of sensors of said sensor mat has a portion positioned proximate a sector of said surface to supply a signal reflecting a change in said electrical characteristic upon application of said pressure to said surface at said location in each of said plurality of sectors.

9. The detector of claim 7 wherein said six branch members includes two central members each having five sensors of said plurality of sensors.

10. The detector of claim 7 wherein said six branch members includes two outer members each having three sensors of said plurality of sensors.

11. The detector of claim 7 wherein said six branch members includes a left inboard member and a right inboard member each having six sensors of said plurality of sensors.

12. The detector of claim 7 wherein said six branch members includes 22 sensors.

13. The detector of claim 7 wherein said six branch members includes 24 sensors.

14. The detector of claim 7 wherein said six branch members includes two central members each having four sensors of said plurality of sensors secured thereto, two outer members each having three sensors of said plurality of sensors secured thereto, a left inboard member having six sensors of said plurality of sensors secured thereto and a right inboard member each having six sensors of said plurality of sensors secured thereto.

15. A sensor array for detecting deflection at a plurality of locations on said array, said array including:

a plurality of sensors positioned proximate a deflectable surface and configured in an array with each sensor positioned for mechanical deflection of a portion thereof upon the deflection at a plurality of locations of said deflectable surface, each sensor of said plurality of sensors being of the type which has a flexible and deflectable substrate and predictably and measurably changes electrical resistance upon the deflection of a portion thereof, said deflectable and flexible substrate of each sensor of said plurality of sensors having a longitudinal axis deflectable about a transverse axis which is transverse to said longitudinal axis and each sensor of said plurality of sensors including a conductive ink deposited on said substrate;

conductor means connected to each of said sensors to supply electrical power thereto and to transmit therefrom signals reflective of changes in said electrical resistance of each of said sensors upon the deflection of said deflectable surface; and terminal means electrically conductively connected to said conductor means for electrical connection to a source of electrical power for receiving and supplying electrical power to sensors of said plurality of said sensors and for electrical connection to an external circuit configured to receive signals reflective of the changes in the electrical resistance of each of said sensors.

16. The sensor array of claim 15 wherein said conductor means includes a trunk member with a plurality of branch members connected thereto and extending therefrom, each trunk member being formed to have at least one sensor of said plurality of sensors.

17. The sensor array of claim 16 wherein said array includes six branch members each spaced from the others.

18. The sensor array of claim 17 wherein said six branch members includes two central members each having five sensors of said plurality of sensors.

19. The sensor array of claim 17 wherein said six branch members includes two outer members each having three sensors of said plurality of sensors.

20. The sensor array of claim 17 wherein said six branch members includes a left inboard member and a right inboard member each having six sensors of said plurality of sensors.

21. The sensor array of claim 17 wherein said six branch members includes 22 sensors.

22. The sensor array of claim 17 wherein said six branch members includes 24 sensors.

23. The sensor array of claim 17 wherein said six branch members includes two central members each having four sensors of said plurality of sensors formed therewith, two outer members each having three sensors of said plurality of sensors formed therewith, a left inboard member having six sensors of said plurality of sensors formed therewith and a right inboard member each having six sensors of said plurality of sensors formed therewith.

24. The sensor array of claim 17 wherein said sensor array is generally polygonal in projection.

25. A sensor mechanism for detecting deflection at a plurality of locations on an associated surface, said mechanism including:

a plurality of sensors each positioned for mechanical deflection of a portion thereof upon the deflection at a respective location of a plurality of locations of an associated surface and each sensor of said plurality of sensors being of the type which has a flexible and deflectable substrate and predictably and measurably changes electrical resistance upon the deflection of a portion of said flexible and deflectable substrate, said flexible and deflectable substrate of each sensor of said plurality of sensors having a longitudinal axis and a width with a transverse axis;

conductor means connected to each of said sensors to supply electrical power thereto and to transmit therefrom signals reflective of changes in said electrical resistance of each of said sensors upon the deflection of said associated surface;

terminal means electrically conductively connected to said conductor means for electrical connection to a source of electrical power for receiving and supplying electrical power to sensors of said plurality of said sensors and for electrical connection to an external circuit configured to receive signals reflective of the changes in the electrical resistance of each of said sensors; and deflector means positioned relative to each sensor of said plurality of sensors for deflecting each said sensor of said plurality of sensors upon deflection of said associated surface and said deflector means having a longitudinal axis generally in alignment with said transverse axis.

26. The sensor mechanism of claim 25 wherein said deflector means is shaped to act as a fulcrum about which said flexible and deflectable substrate may deflect, and wherein said deflector means is sized to extend substantially the width of said flexible and deflectable substrate.

27. The sensor mechanism of claim 25 wherein said deflector mens is cylindrical in shape.

28. A system for detecting the presence and relative magnitude of pressures applied at a plurality of spaced apart locations on an exterior substrate and for generating signals reflective of the profile and the magnitude of the pressures relative to each other applied at said plurality of locations, said system comprising:

an exterior substrate which is deflectable upon the application of a pressure at all locations of a plurality of locations, said exterior substrate having a plurality of sectors each having one said location;

a base positioned proximate said exterior substrate;

a sensor mat positioned between said base and said exterior substrate to be mechanically deflected upon mechanical deflection of said exterior substrate at each of said plurality of locations upon application of said pressures at each of said locations, said sensor mat having a flexible and deflectable substrate formed with a plurality of sensors each positioned for mechanical deflection of a portion thereof upon the deflection of said exterior substrate at said plurality of locations and each sensor of said plurality of sensors being of the type which predictably changes a electrical resistance upon mechanical deflection of a portion thereof, a sensor of said plurality of sensors of said sensor mat being positioned proximate each sector of said substrate to supply a signal reflecting a change in said electrical resistance upon application of pressure to said exterior substrate in said sector, said flexible and deflectable substrate of each said sensor being configured to have a longitudinal axis and to deflect about a transverse axis transverse to said longitudinal axis and each said sensor having an electrically conductive composition deposited on said flexible and deflectable substrate in a pattern to be deflected with said flexible and deflectable substrate about said transverse axis;

conductor means connected to each of said sensors to supply electrical power thereto and to transmit therefrom signals reflective of changes in said electrical resistance of each of said sensors upon the application of a said pressure to said exterior substrate, said conductor means including a trunk member with a plurality of six branch members attached there to and extending away therefrom, each branch member having at least one sensor of said plurality of sensors formed therewith;

terminal means electrically associated with said conductor means for electrical connection to a source of electrical power for receiving and supplying electrical power to sensors of said plurality of said sensors and for electrical connection to an external circuit configured to receive signals reflective of the changes in the electrical resistance of each of said and a deflector mechanism positioned relative to each of said plurality of sensors for contacting said sensor upon application of said pressure.

29. The system of claim 28 wherein said deflector has a longitudinal axis generally in alignment with said transverse axis, wherein said flexible and deflectable substrate has a width, wherein said deflector is shaped to act as a fulcrum about which said flexible and deflectable substrate may deflect upon application of said pressure; and wherein said deflector is sized to extend substantially the width of said flexible and deflectable substrate.

30. The system of claim 29 wherein said exterior surface is the outer material layer of a vehicle seat and said base is the structure of said vehicle seat for supporting said outer material layer.

* * * * *